United States Patent
Kurahashi et al.

(10) Patent No.: US 10,266,167 B2
(45) Date of Patent: Apr. 23, 2019

(54) EMERGENCY STOP SYSTEM AND EMERGENCY STOP METHOD

(71) Applicant: HONDA MOTOR CO., LTD., Tokyo (JP)

(72) Inventors: Yukinori Kurahashi, Wako (JP); Kei Oshida, Wako (JP); Masayuki Nakatsuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 15/335,760

(22) Filed: Oct. 27, 2016

(65) Prior Publication Data

US 2017/0120887 A1     May 4, 2017

(30) Foreign Application Priority Data

Oct. 28, 2015 (JP) .................................. 2015-212389

(51) Int. Cl.
*B60W 10/18*     (2012.01)
*B60Q 1/46*     (2006.01)

(52) U.S. Cl.
CPC ............... *B60W 10/18* (2013.01); *B60Q 1/46* (2013.01); *B60W 2710/18* (2013.01)

(58) Field of Classification Search
CPC ...... B60W 10/18; B60W 2710/18; B60Q 1/46
USPC ......................................................... 701/70
See application file for complete search history.

(56) References Cited

FOREIGN PATENT DOCUMENTS

| JP | 2003-233886 A | * | 8/2003 |
|----|---------------|---|--------|
| JP | 2003-269211 A |   | 9/2003 |
| JP | 2007-320456 A |   | 12/2007 |
| JP | 2014-213660 A | * | 11/2014 |

OTHER PUBLICATIONS

Japanese Office Action dated Jun. 20, 2017 (mailing date), issued in counterpart Japanese Patent Application No. 2015-212389 with English translation.

* cited by examiner

*Primary Examiner* — Brian P Sweeney
(74) *Attorney, Agent, or Firm* — Westerman, Hattori, Daniels & Adrian, LLP

(57) ABSTRACT

An emergency stop system includes a hazard switch that is a momentary switch, an automatic stop controller that performs automatic stop control for causing a vehicle to automatically stop when a predetermined condition is met, and a hazard light controller that controls hazard lights. While automatic stop control is not being performed, the hazard light controller switches the hazard lights between a flashing state and a turned-off state each time a user presses the hazard switch. The hazard light controller brings the hazard lights into the flashing state upon start of the automatic stop control, and turns off the hazard lights (i.e., transitions the hazard lights to the turned-off state) upon depression of the hazard switch while the hazard lights are flashing during execution of the automatic stop control.

15 Claims, 12 Drawing Sheets

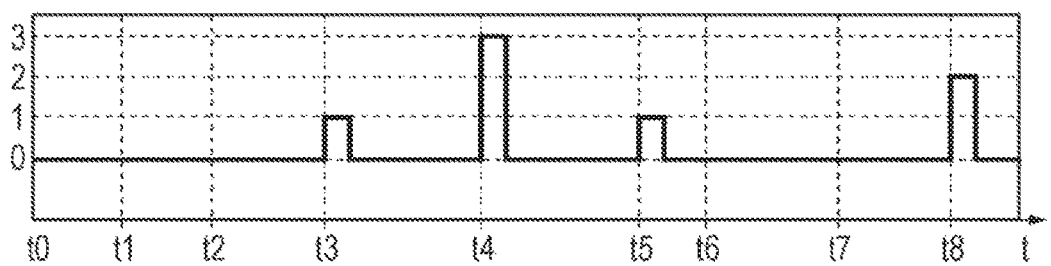
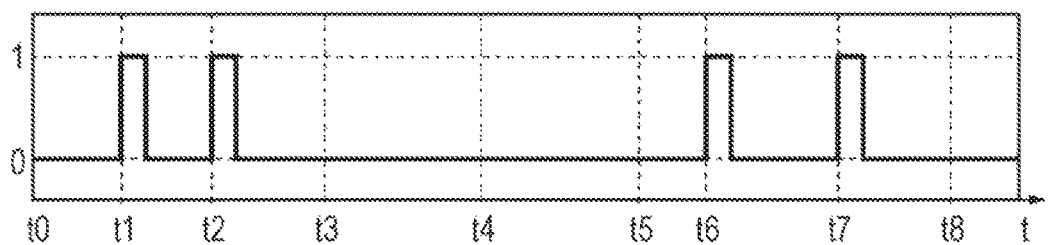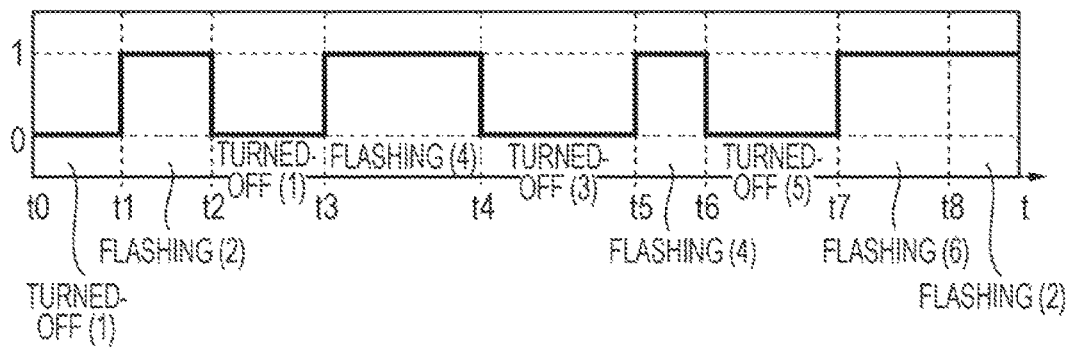

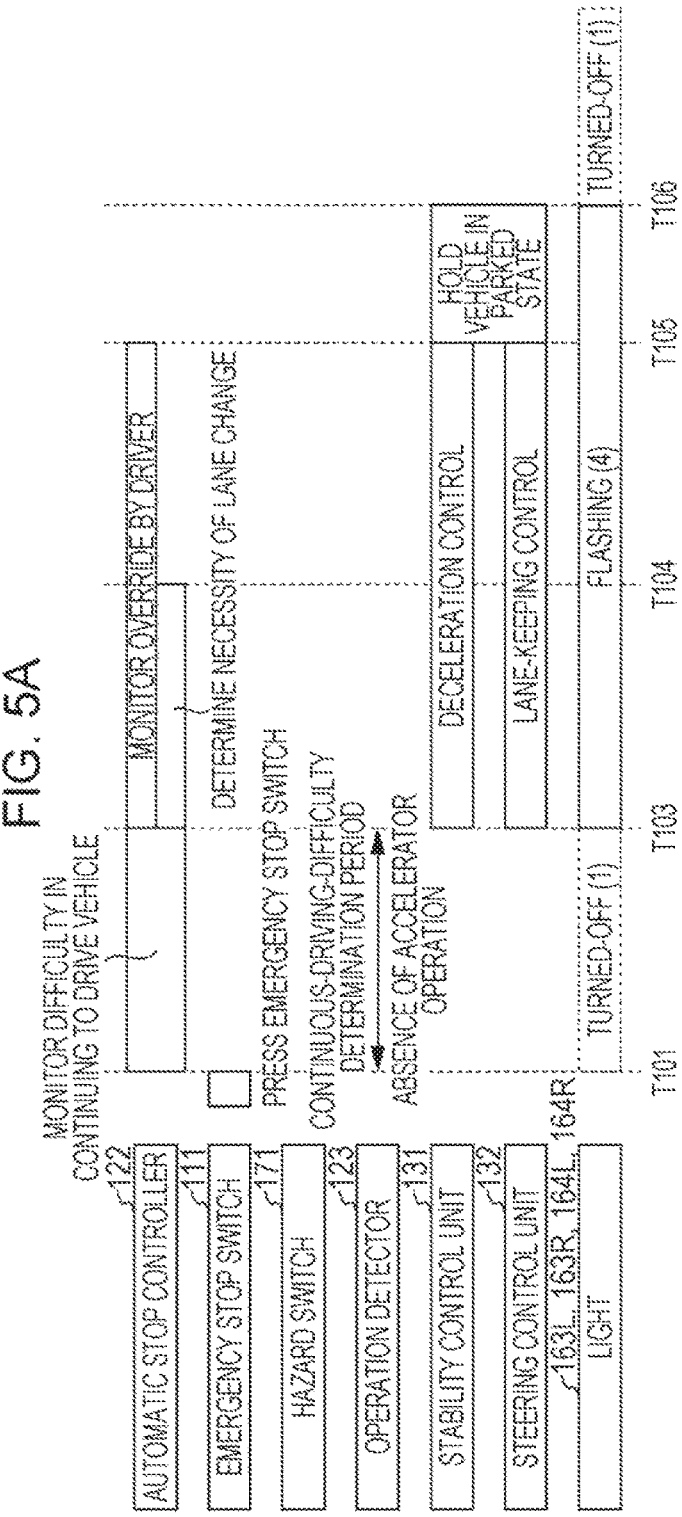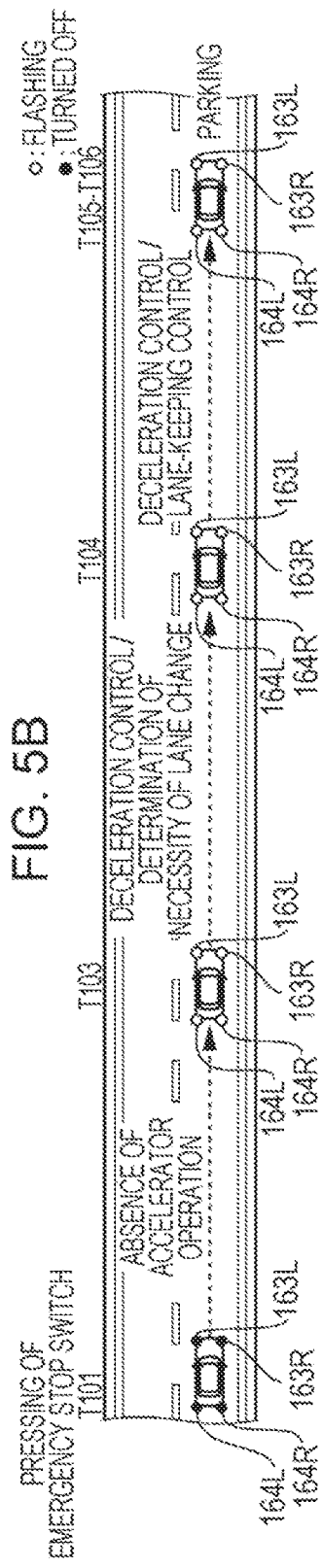

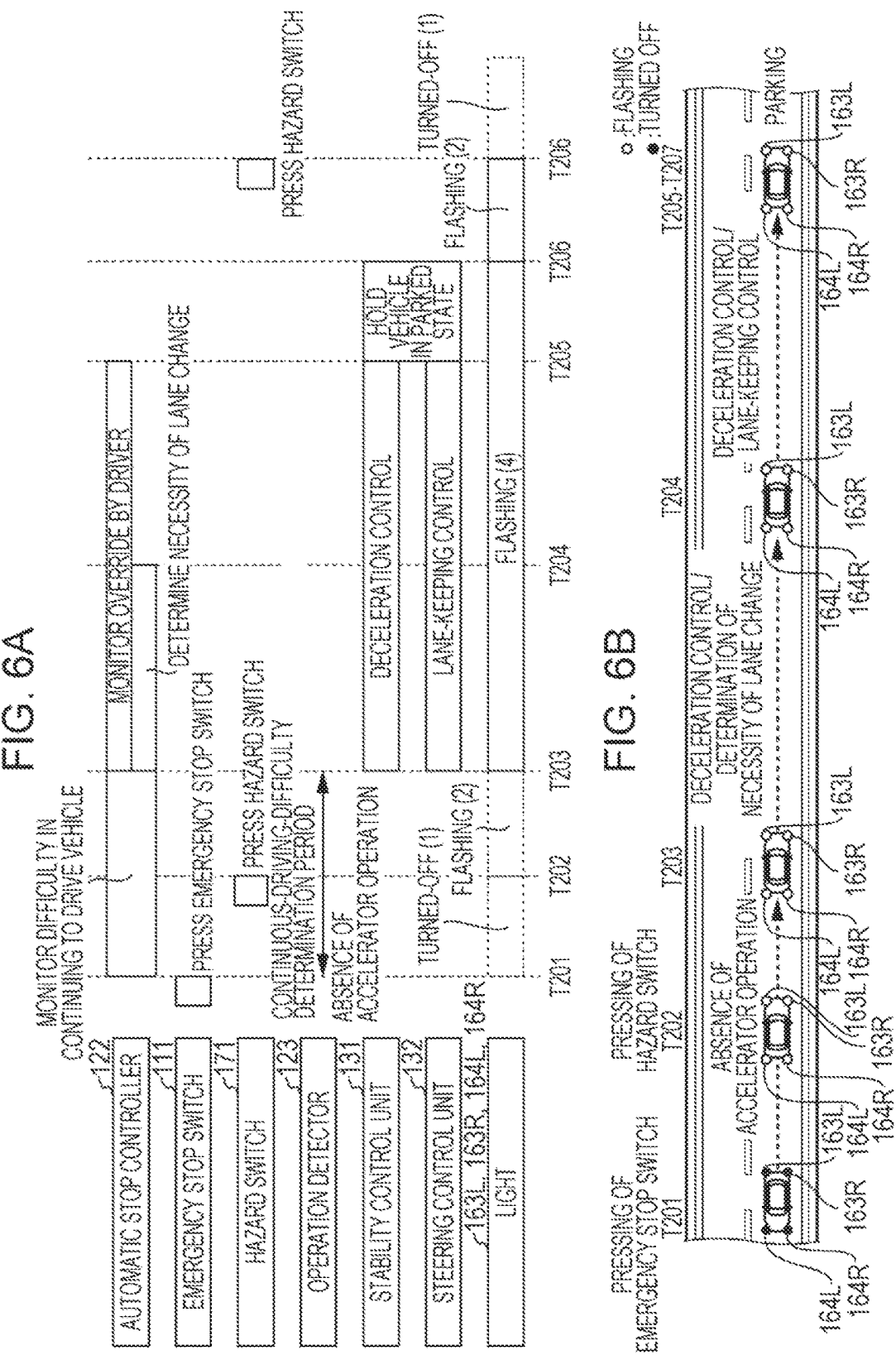

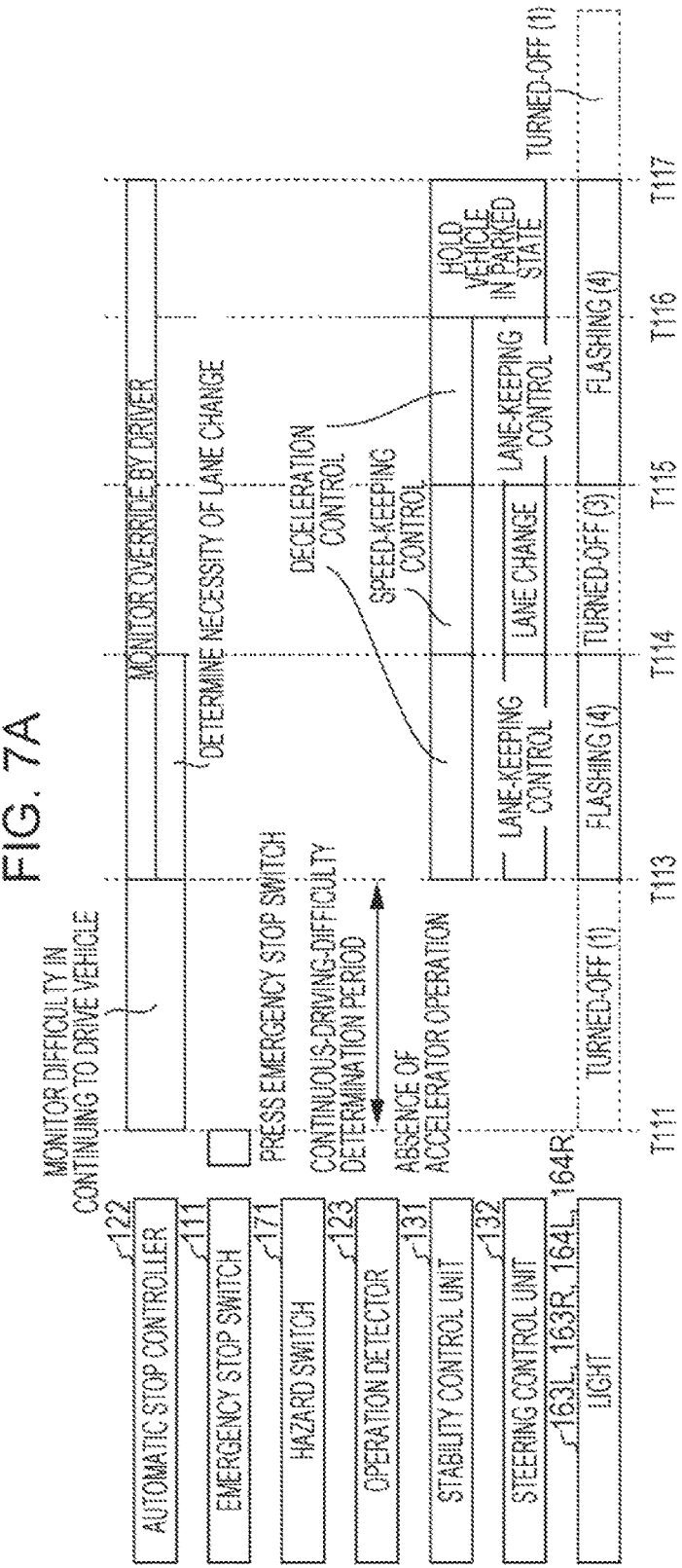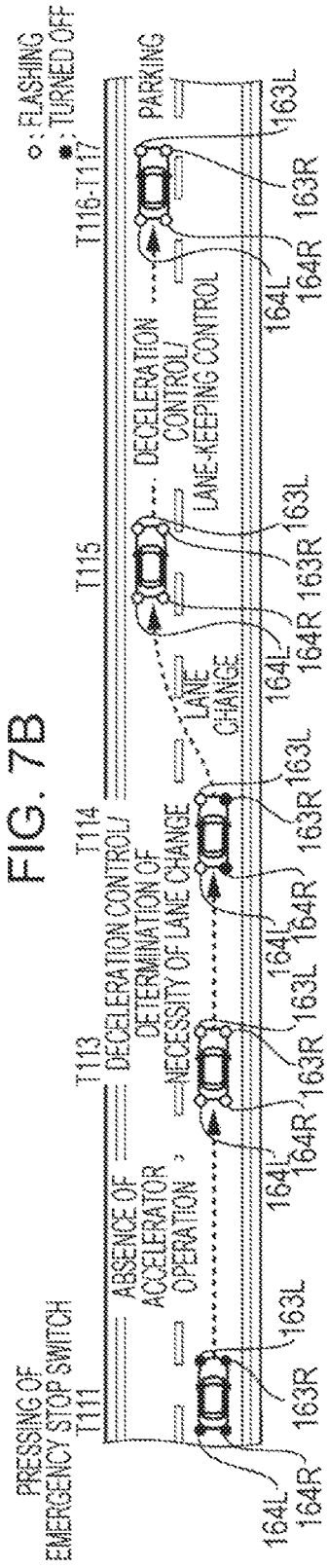
FIG. 7A
FIG. 7B

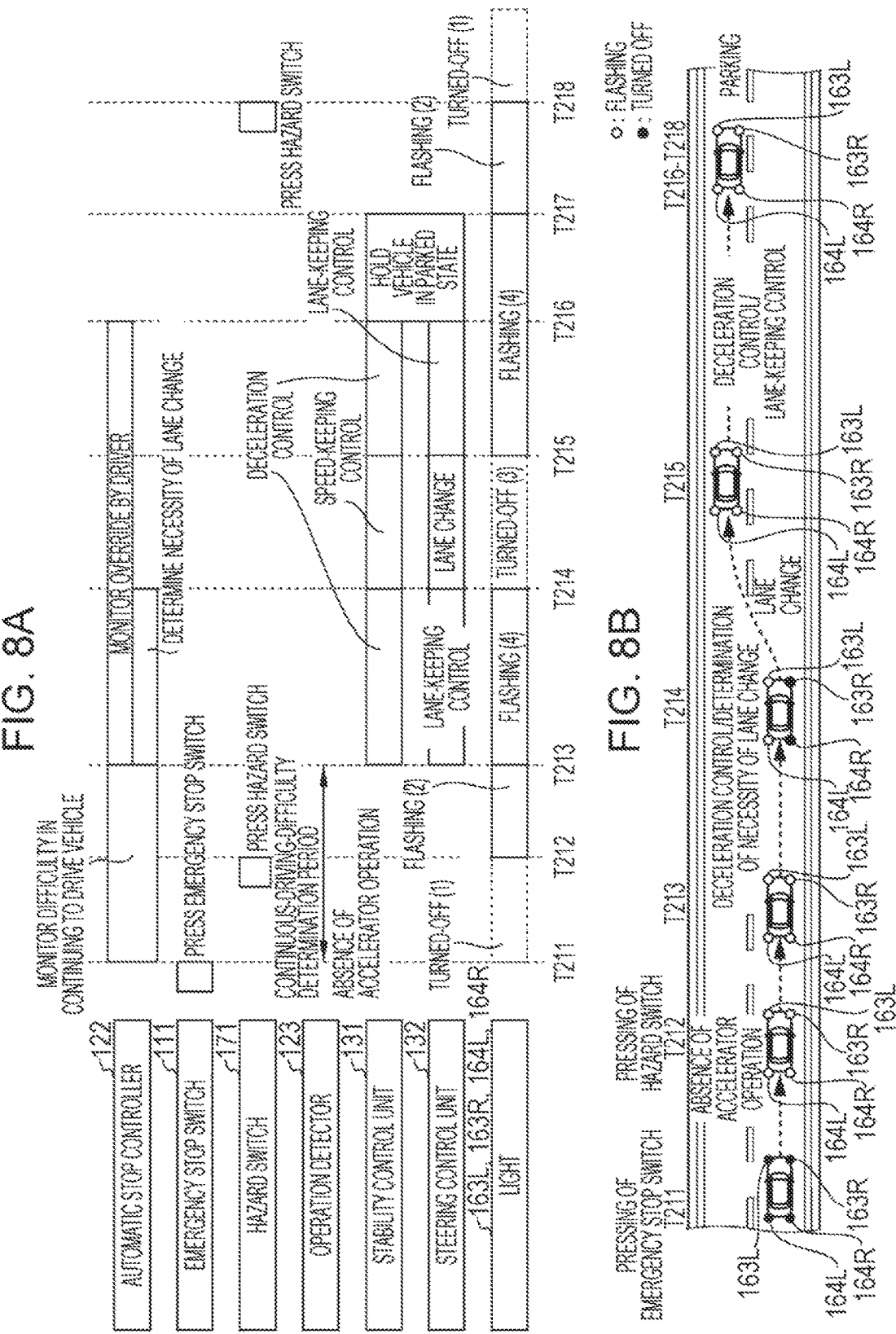

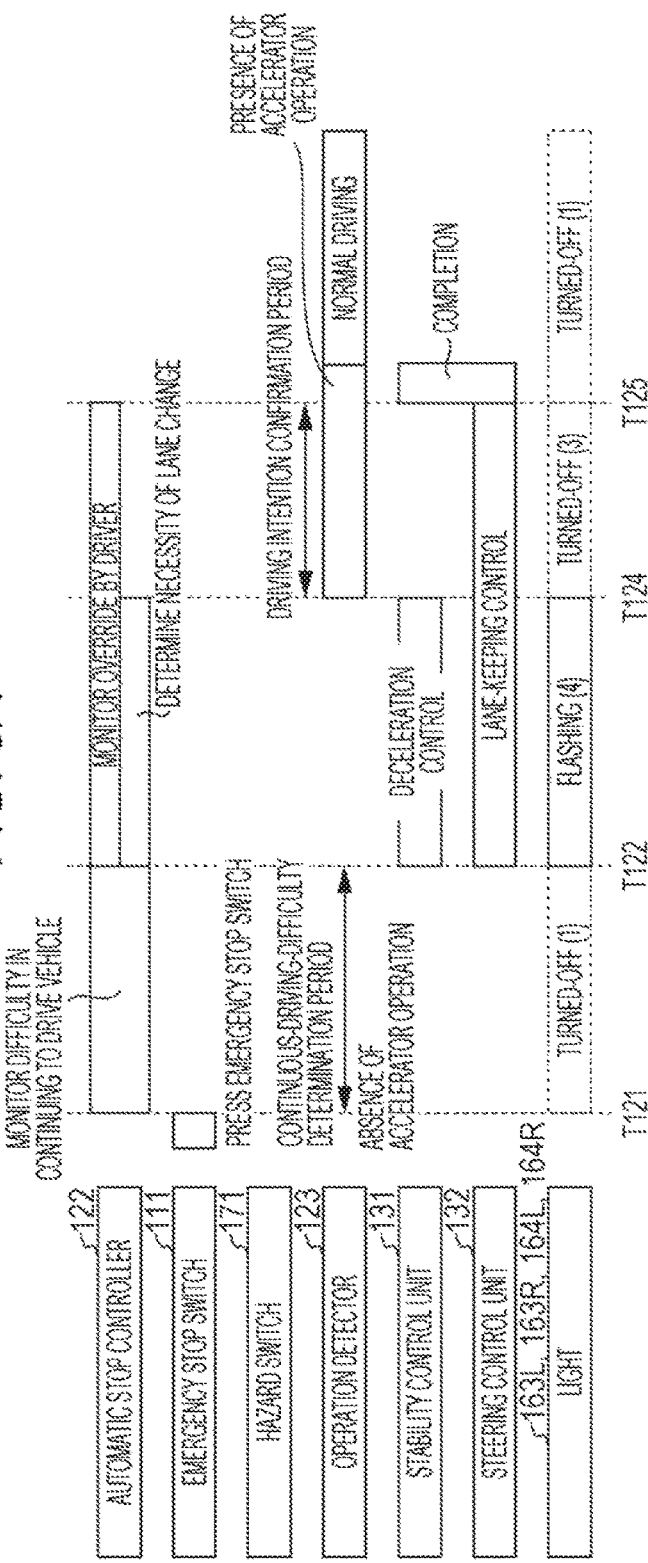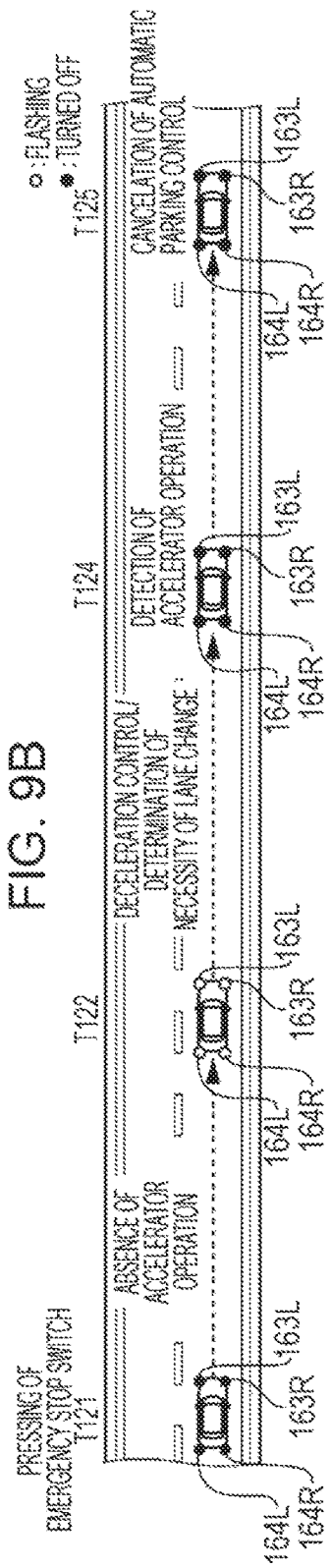

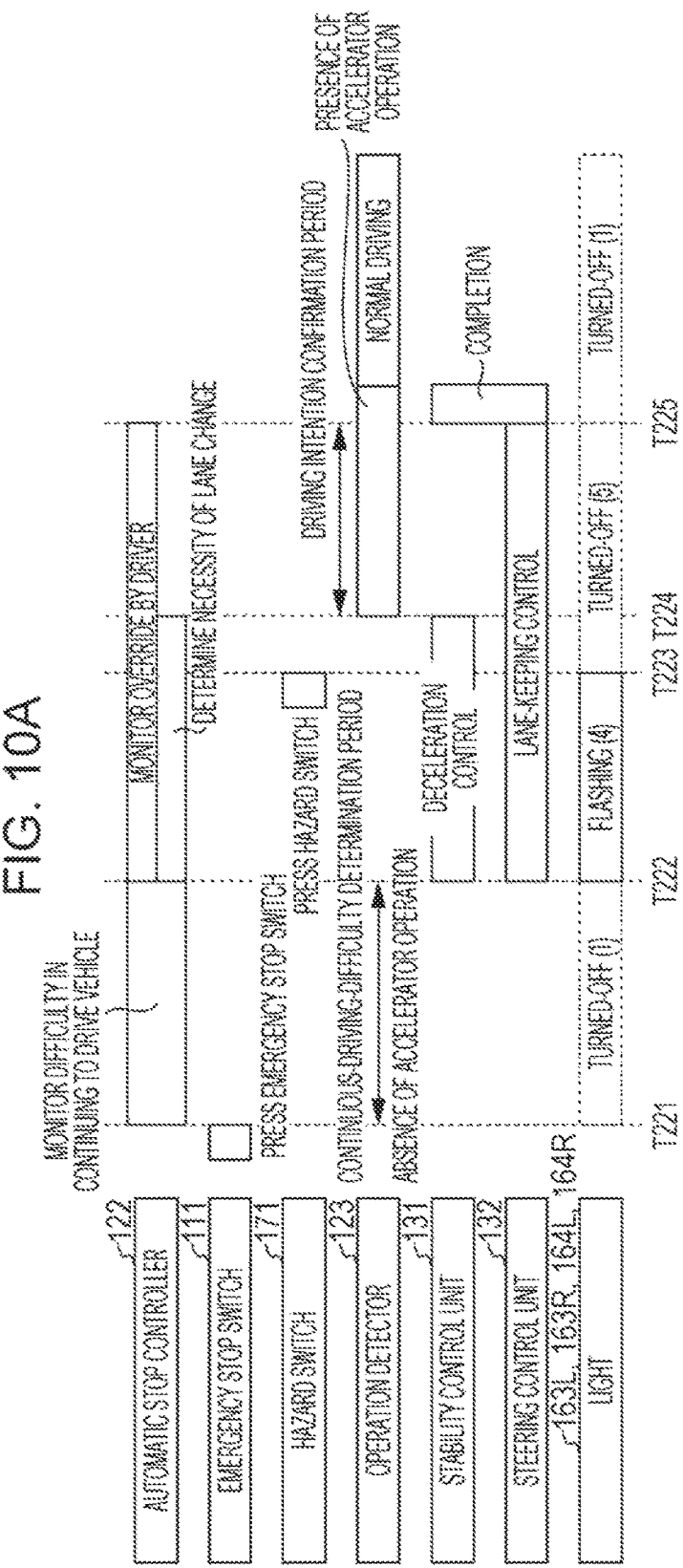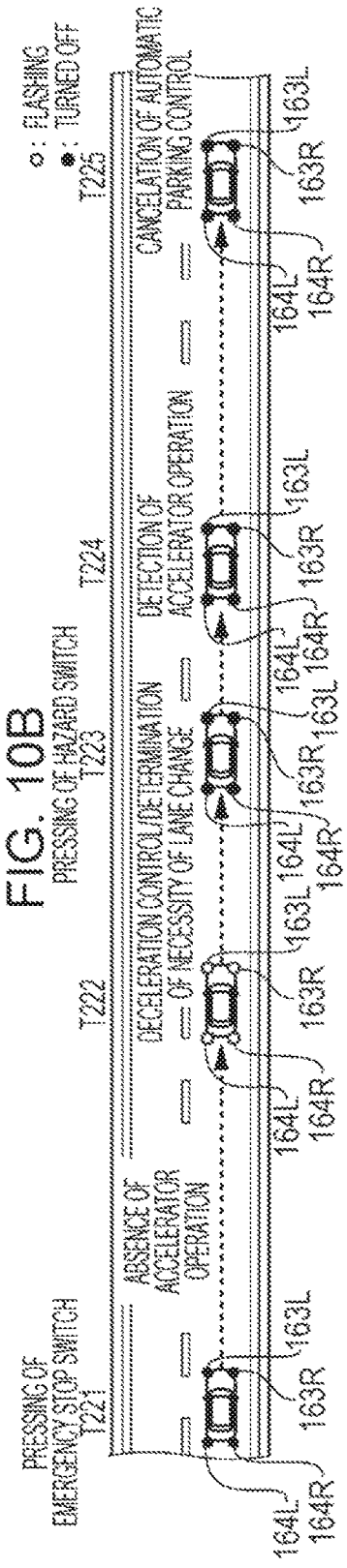

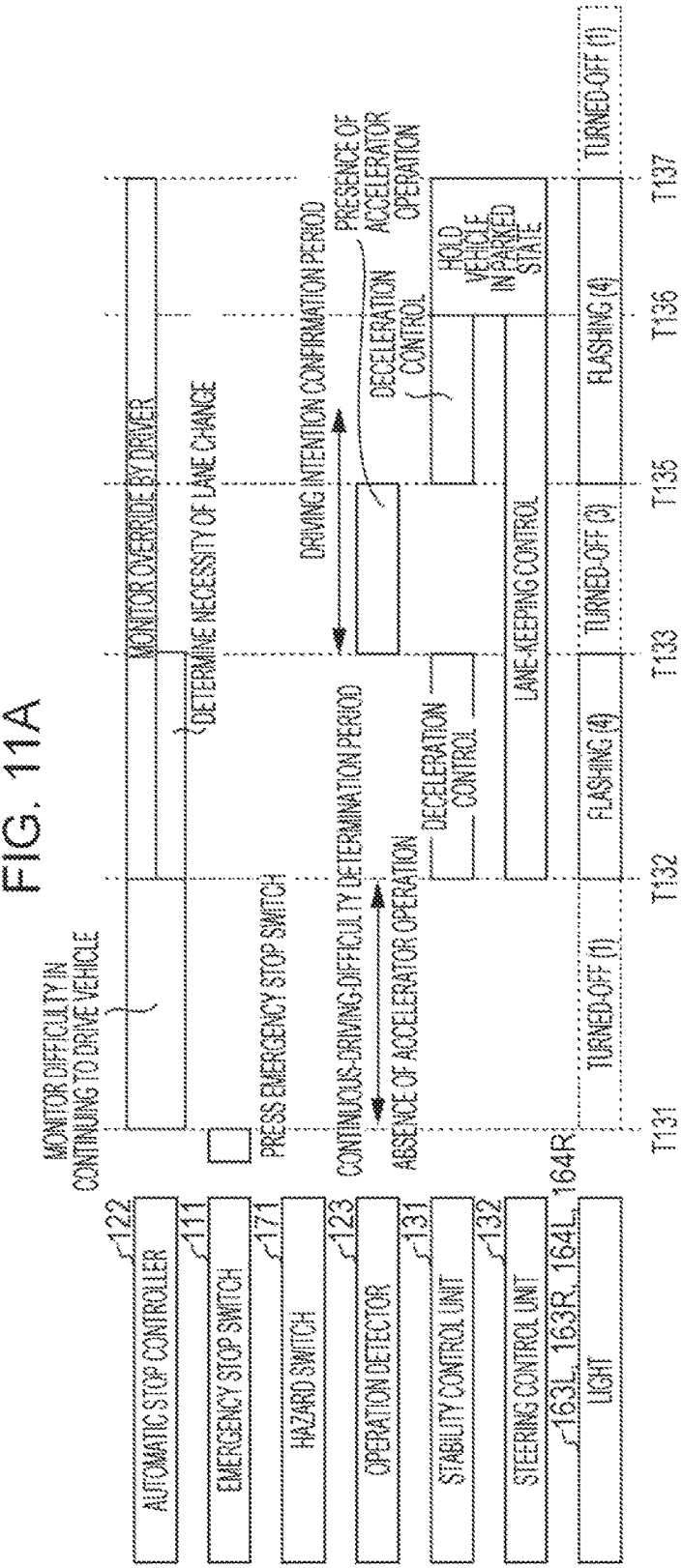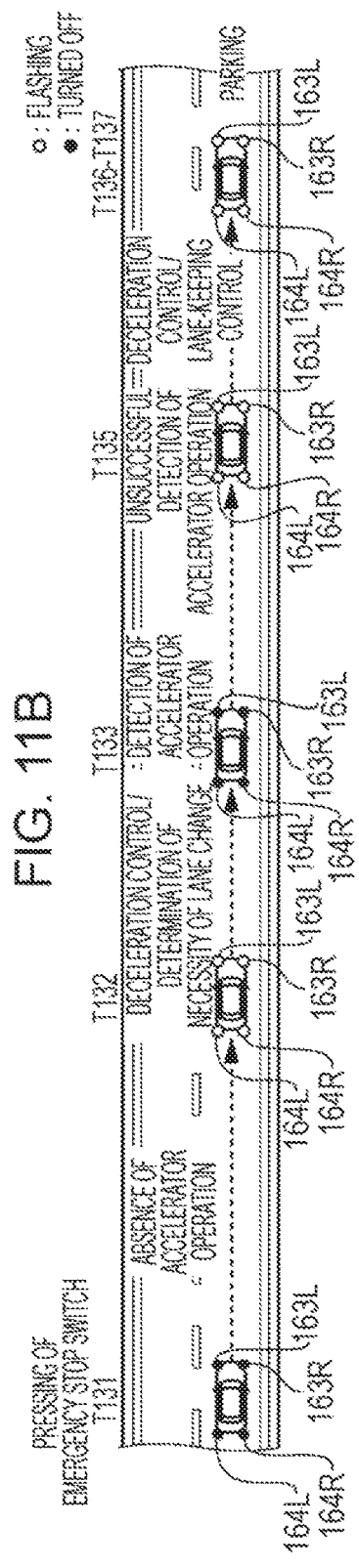

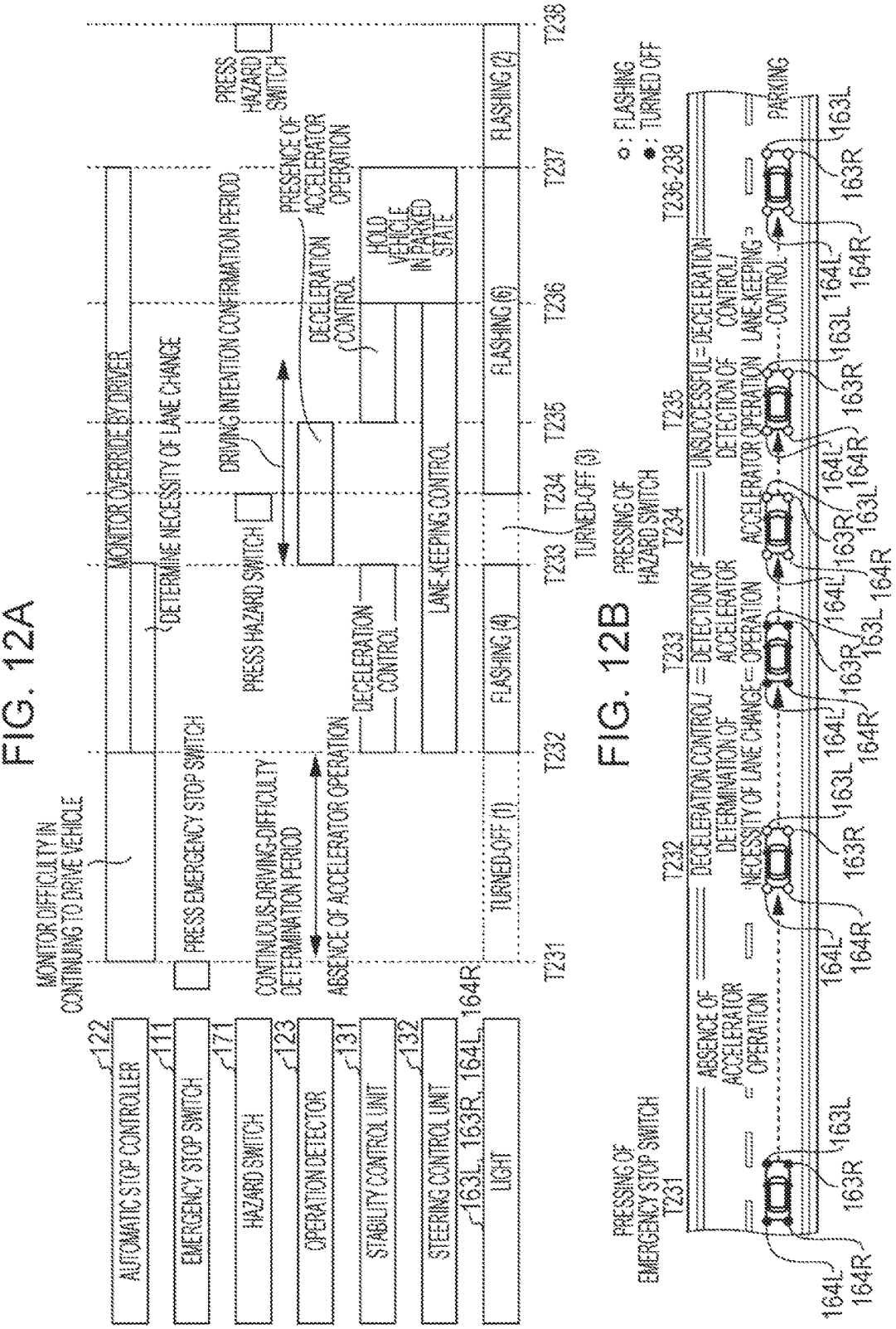

EMERGENCY STOP SYSTEM AND EMERGENCY STOP METHOD

CROSS REFERENCES TO RELATED APPLICATIONS

The present application claims priority under 35 U.S.C. § 119 to Japanese Patent Application No. 2015-212389, filed Oct. 28, 2015, entitled "Emergency Stop System and Emergency Stop Method." The contents of this application are incorporated herein by reference in their entirety.

TECHNICAL FIELD

The present disclosure relates to an emergency stop system and an emergency stop method for bringing a vehicle to an emergency stop.

BACKGROUND

Emergency stop systems are known in the related art for dealing with a situation where it is difficult for a driver of a vehicle to continue to drive the vehicle.

For example, there has been proposed an emergency warning apparatus for a vehicle, which is provided with an emergency warning device for, in response to depression of an emergency warning button, sending a request to a control device for the vehicle to bring the vehicle to an automatic stop and sending instructions to a hazard light control device to turn on hazard lights (see Japanese Unexamined Patent Application Publication No. 2003-233886).

The proposed emergency warning apparatus for a vehicle allows the hazard lights to be turned on when performing a process for bringing the vehicle to an automatic stop, which can alert nearby vehicles such as vehicles approaching from the rear that the vehicle is operating under emergency stop conditions.

In the technique disclosed in Japanese Unexamined Patent Application Publication No. 2003-233886, a user operation potentially conflicts with an operation of controlling the hazard lights to be turned on, which is involved in a process for bringing the vehicle to an automatic stop. Thus, the hazard lights may be unintentionally controlled to be turned on and such control may cause the user to feel awkward.

SUMMARY

The present application describes, for example, an emergency stop system and an emergency stop method which may eliminate or reduce the awkward feeling that the user experiences during the turning on of hazard lights, which is involved in a process for bringing a vehicle to an automatic stop.

An emergency stop system according to an aspect of the present disclosure includes a hazard switch, an automatic stop controller, and a hazard light controller. The hazard switch is a momentary switch adapted to provide an instruction to flash or turn off hazard lights of a vehicle. The automatic stop controller performs automatic stop control for causing the vehicle to automatically stop when a predetermined condition is met. The hazard light controller controls the hazard lights so as to switch the hazard lights between a flashing state and a turned-off state each time a user presses the hazard switch while the automatic stop control is not being performed, to bring the hazard lights into the flashing state upon start of the automatic stop control, and to turn off the hazard lights upon depression of the hazard switch while the hazard lights are flashing during execution of the automatic stop control.

Prior to the description of the operation and advantages of the emergency stop system according to the aspect of the present disclosure, a brief description is given of a traditional hazard switch.

The traditional hazard switch is typically an alternate switch. When the alternate switch is pressed while in a free state (e.g., in its released position), the alternate switch transitions to an operating state (e.g., its depressed position) and is held in the operating state until the alternate switch is pressed again. When the alternate switch is pressed while in the operating state, the alternate switch transitions to the free state and is held in the free state until the alternate switch is pressed again.

The traditional hazard switch is configured such that the hazard lights are controlled to be turned off while the alternate switch is in the free state and the hazard lights are controlled to flash while the alternate switch is in the operating state.

However, once automatic stop control is started, the hazard lights are caused to flash regardless of the operation of the hazard switch. Thus, in a case where an alternate switch is adopted, the hazard lights are brought into a flashing state even while the alternate switch is in a free state (or in its released position), which may make the user (i.e., the vehicle driver or a passenger) feel awkward.

In addition, in order to turn off the hazard lights which are brought into the flashing state due to automatic stop control, the user presses the alternate switch once to bring the alternate switch into an operating state (or its depressed position) and then presses the alternate switch again to bring the alternate switch into a free state (or its released position). This operation may inconvenience the user.

To address the issues described above, in the emergency stop system according to the aspect of the present disclosure, while automatic stop control is not being performed, the hazard light controller allows the hazard lights to be switched between a flashing state and a turned-off state each time the hazard switch is pressed.

Here, in the aspect of the present disclosure, the hazard switch is implemented as a momentary switch. The momentary switch is configured to, when the momentary switch is pressed while in a free state (e.g., in its released position), temporarily transition to an operating state (e.g., its depressed position) and then return to the free state. This configuration allows the hazard switch to be held in the free state when the hazard switch is not being operated by the user, regardless of whether the hazard lights are in a flashing state or a turned-off state.

In addition, when the hazard lights are controlled to flash by the hazard light controller in response to the execution of automatic stop control by the automatic stop controller, similarly to when the hazard lights are in a flashing state while automatic stop control is not being performed, the hazard switch is in the free state.

In addition, when the user presses the hazard switch once while the hazard lights are in a flashing state due to automatic stop control, the hazard lights are turned off by the hazard light controller. Also in this case, similarly to when the hazard lights are in a turned-off state while automatic stop control is not being performed, the hazard switch is in the free state.

As described above, the emergency stop system according to the aspect of the present disclosure may eliminate or reduce the awkward feeling that the user experiences for the state of the hazard switch and eliminate or reduce the inconvenience caused by the operation of turning off the hazard lights using the hazard switch during the flashing of the hazard lights which is involved in a process for bringing the vehicle to an automatic stop.

Preferably, the emergency stop system further includes an emergency stop switch separate from the hazard switch, and the predetermined condition includes a condition in which the emergency stop switch is pressed.

In the emergency stop system having the configuration described above, the automatic stop controller performs automatic stop control on condition that the emergency stop switch is operated.

The user may wish to turn off the hazard lights in some cases, such as when the emergency stop switch has been pressed unintentionally due to an operation error or the like but the user does not recognize the depression of the emergency stop switch or when the user wishes to temporarily continue to drive the vehicle although the user has intentionally pressed the emergency stop switch. In such cases, as described above, the user may be able to turn off the hazard lights by operating the hazard switch once.

Preferably, the emergency stop system further includes a driving operation detector that detects a presence or absence of a predetermined driving operation of the vehicle, and the predetermined condition includes a condition in which the absence of the predetermined driving operation is continuously detected by the driving operation detector for a predetermined first period.

In the emergency stop system having the configuration described above, the automatic stop controller performs automatic stop control on condition that the absence of the predetermined driving operation is continuously detected by the driving operation detector for a predetermined first period.

In some cases, such as when the user (the vehicle driver) wishes to resume the driving operation, the user may wish to turn off the hazard lights by using the hazard switch even during execution of the automatic stop control. In such cases, the user may be able to turn off the hazard lights by pressing the hazard switch once.

Preferably, the emergency stop system further includes a driving operation detector that detects a presence or absence of a predetermined driving operation of the vehicle, and the automatic stop controller terminates the automatic stop control in a case where the presence of the predetermined driving operation is continuously detected by the driving operation detector for a predetermined second period during execution of the automatic stop control.

In the emergency stop system having the configuration described above, if the presence of the predetermined driving operation is continuously detected by the driving operation detector for a predetermined second period during execution of the automatic stop control, the automatic stop control is terminated. If the driving operation detected by the driving operation detector continues for a predetermined second period during execution of the automatic stop control, the vehicle driver is more likely to have a driving intention. Thus, by terminating the automatic stop control, it may be possible to achieve the control intended by the vehicle driver.

In some cases, the user attempts to turn off the hazard lights by using the hazard switch before or after the resumption of the driving operation. In such cases, the user may be able to turn off the hazard lights by pressing the hazard switch once.

In the emergency stop system, preferably, the hazard light controller causes the hazard lights to be turned off upon completion of the automatic stop control in a case where the hazard lights are brought into the flashing state in accordance with the automatic stop control, and continues the flashing state of the hazard lights after completion of the automatic stop control in a case where the hazard lights are brought into the flashing state in response to depression of the hazard switch before start of the automatic stop control or during execution of the automatic stop control.

While the hazard lights are flashing in accordance with automatic stop control, if the automatic stop control is completed, in many case, it is predicted that the flashing of the hazard lights will no longer be necessary. Thus, even if the hazard light controller terminates the flashing of the hazard lights in response to the completion of the automatic stop control, the user will not feel very awkward.

In contrast, if the user presses the hazard switch to bring the hazard lights into the flashing state, it is predicted that the user will wish to flash the hazard lights regardless of the execution of automatic stop control. In this case, the hazard light controller causes the hazard lights to continue to flash even after the automatic stop control has been completed, thereby reducing or preventing the awkward feeling that the user experiences.

In the emergency stop system, preferably, the hazard light controller is configured to turn off the hazard lights when the automatic stop controller starts execution of predetermined control during execution of the automatic stop control, and to cause the hazard lights to resume flashing upon completion of the predetermined control during execution of the automatic stop control.

Keeping the hazard lights flashing during execution of the automatic stop control may make the user and occupants of other vehicles feel awkward. The emergency stop system having the configuration described above may allows the hazard light controller to control the flashing or turning off of the hazard lights, thereby eliminating or reducing the awkward feeling that user or occupants of other vehicles experience for the flashing or turning off of the hazard lights.

In the emergency stop system having the configuration described above, preferably, the predetermined control comprises a lane change that involves causing turn signal lights of the vehicle to flash.

When a lane change which involves causing turn signal lights to flash is performed, the flashing of the turn signal lights may be visually indistinguishable while the hazard lights are in the flashing state. To address this situation, in the emergency stop system having the configuration described above, the hazard light controller turns off the hazard lights when a lane change is performed during execution of the automatic stop control. This may eliminate or reduce the awkward feeling that occupants of other vehicles experience because the flashing of the turn signal lights are visually indistinguishable.

Preferably, the emergency stop system further includes an acceleration operation detector that detects an acceleration operation of the vehicle. Preferably, furthermore, the automatic stop controller is configured to interrupt the automatic stop control in a case where the acceleration operation is detected by the acceleration operation detector during execution of the automatic stop control, and is configured to terminate the automatic stop control in a case where the acceleration operation is continuously detected by the acceleration operation detector for a predetermined third period or longer after interruption of the automatic stop control, and to resume the automatic stop control in a case where the acceleration operation is no longer detected by the acceleration operation detector before the third period elapses after interruption of the automatic stop control. Preferably, moreover, the hazard light controller is configured to turn off the hazard lights during interruption of the automatic stop control, and to cause the hazard lights to resume flashing in response to resumption of the automatic stop control.

In the emergency stop system having the configuration described above, in response to an acceleration operation being detected by the acceleration operation detector during execution of the automatic stop control, the automatic stop controller interrupts the automatic stop control and the hazard light controller turns off the hazard lights. This allows the user and occupants of other vehicles to recognize interruption of the automatic stop control without user inconvenience caused by operation of the hazard switch.

In addition, if the acceleration operation continues for a predetermined period (third period) or longer, it is predicted that the acceleration operation is an operation based on the driving intention of the vehicle driver, whereas, if the duration of the acceleration operation is less than the predetermined period (third period), it is difficult to determine whether or not the acceleration operation is based on the driving intention of the driver. To address this situation, the automatic stop controller performs control to terminate the automatic stop control or to resume the automatic stop control in accordance with whether or not the acceleration operation continues for the predetermined third period or longer. Thus, the control intended by the vehicle driver is achievable.

Furthermore, the hazard light controller causes the hazard lights to resume flashing in response to the resumption of the automatic stop control. This allows the user and occupants of other nearby vehicles to recognize the resumption of the automatic stop control without user inconvenience caused by operation of the hazard switch.

As described above, the emergency stop system having the configuration described above allows the driving intention of the user to be reflected and allows the hazard lights to be controlled to flash or stop flashing in accordance with the state of the execution of automatic stop control. This allows the user and occupants of other vehicles to recognize the state of the execution of automatic stop control without user inconvenience caused by operation of the hazard switch.

In the emergency stop system having the configuration described above, preferably, the hazard light controller brings the hazard lights into the flashing state upon depression of the hazard switch while the hazard lights are turned off by interruption of the automatic stop control.

When the hazard switch is pressed even if the hazard lights have been turned off in association with automatic stop control, it is predicted that the user will have an intention to resume flashing the hazard lights. To address this situation, in the emergency stop system having the configuration described above, the hazard light controller brings the hazard lights into the flashing state.

An emergency stop system according to another aspect of the present disclosure includes an automatic stop controller, an acceleration operation detector, and a hazard light controller. The automatic stop controller performs automatic stop control to cause a vehicle to automatically stop when a predetermined condition is met. The acceleration operation detector detects an acceleration operation of the vehicle. The hazard light controller brings hazard lights of the vehicle into a flashing state upon start of the automatic stop control. The automatic stop controller is configured to interrupt the automatic stop control in a case where the acceleration operation is detected by the acceleration operation detector during execution of the automatic stop control, and is configured to terminate the automatic stop control in a case where the acceleration operation is continuously detected by the acceleration operation detector for a predetermined fourth period or longer after interruption of the automatic stop control, and to resume the automatic stop control in a case where a duration over which the acceleration operation is detected by the acceleration operation detector after interruption of the automatic stop control is less than the fourth period. The hazard light controller is configured to turn off the hazard lights in response to interruption of the automatic stop control, and to cause the hazard lights to flash in response to resumption of the automatic stop control.

In the emergency stop system having the configuration described above, in response to an acceleration operation being detected by the acceleration operation detector during execution of the automatic stop control, the automatic stop controller interrupts the automatic stop control and the hazard light controller turns off the hazard lights. This allows the user and occupants of other vehicles to recognize interruption of the automatic stop control.

In addition, if the acceleration operation continues for a predetermined period (fourth period) or longer, it is predicted that the acceleration operation is an operation based on the driving intention of the vehicle driver, whereas, if the duration of the acceleration operation is less than the predetermined period (fourth period), it is difficult to determine whether or not the acceleration operation is based on the driving intention of the driver. To address this situation, the automatic stop controller performs control to terminate the automatic stop control or to resume the automatic stop control in accordance with whether or not the acceleration operation continues for the predetermined fourth period or longer. Thus, the control intended by the vehicle driver is achievable.

Furthermore, the hazard light controller causes the hazard lights to resume flashing in response to the resumption of the automatic stop control. This allows the user and occupants of other nearby vehicles to recognize the resumption of the automatic stop control.

As described above, the emergency stop system having the configuration described above allows the driving intention of the user to be reflected and allows the hazard lights to be controlled to flash or stop flashing in accordance with the state of the execution of automatic stop control. This allows the user and occupants of other vehicles to recognize the state of the execution of automatic stop control.

An emergency stop method according to still another aspect of the present disclosure is an emergency stop method performed by a system including a hazard switch and an automatic stop controller, the hazard switch being a momentary switch adapted to provide an instruction to flash or turn off hazard lights of a vehicle, the automatic stop controller performing automatic stop control for causing the vehicle to automatically stop when a predetermined condition is met. The emergency stop method includes the steps of switching the hazard lights between a flashing state and a turned-off state each time a user presses the hazard switch while the automatic stop control is not being performed; bringing the hazard lights into the flashing state upon start of the automatic stop control; and turning off the hazard lights upon depression of the hazard switch while the hazard lights are flashing during execution of the automatic stop control.

By implementing the emergency stop method according to the aspect of the present disclosure while applying the emergency stop method to a system, it may be possible to achieve an operation and advantages similar to those of the emergency stop system according to the aspects of the present disclosure described above.

BRIEF DESCRIPTION OF THE DRAWINGS

The advantages of the disclosure will become apparent in the following description taken in conjunction with the following drawings.

FIGS. 3A to 3C are time charts illustrating an example relationship between the input and output of the hazard light controller, in which FIG. 3A is a time chart illustrating a hazard control request, FIG. 3B is a time chart illustrating a hazard-switch pressing signal, and FIG. 3C is a time chart illustrating a flashing control signal.

FIGS. 4A to 4C are time charts illustrating another example relationship between the input and output of the hazard light controller, in which FIG. 4A is a time chart illustrating a hazard control request, FIG. 4B is a time chart illustrating a hazard-switch pressing signal, and FIG. 4C is a time chart illustrating a flashing control signal.

FIGS. 5A and 5B are diagrams illustrating the activation of the emergency stop system in automatic stop control, in which FIG. 5A is a diagram illustrating the activation of each component and FIG. 5B is a diagram illustrating a vehicle position and the flashing state of the lights.

FIGS. 6A and 6B are diagrams illustrating the activation of the emergency stop system in response to depression of a hazard switch before execution of automatic stop control, in which FIG. 6A is a diagram illustrating the activation of each component and FIG. 6B is a diagram illustrating a vehicle position and the flashing state of the lights.

FIGS. 7A and 7B are diagrams illustrating the activation of the emergency stop system when a lane change is performed in automatic stop control, in which FIG. 7A is a diagram illustrating the activation of each component and FIG. 7B is a diagram illustrating a vehicle position and the flashing state of the lights.

FIGS. 8A and 8B are diagrams illustrating the activation of the emergency stop system in response to depression of the hazard switch when a lane change is performed due to automatic stop control, in which FIG. 8A is a diagram illustrating the activation of each component and FIG. 8B is a diagram illustrating a vehicle position and the flashing state of the lights.

FIGS. 9A and 9B are diagrams illustrating the activation of the emergency stop system upon detection of continuous accelerator operation in automatic stop control, in which FIG. 9A is a diagram illustrating the activation of each component and FIG. 9B is a diagram illustrating a vehicle position and the flashing state of the lights.

FIGS. 10A and 10B are diagrams illustrating the activation of the emergency stop system upon detection of continuous accelerator operation and detection of depression of the hazard switch in automatic stop control, in which FIG. 10A is a diagram illustrating the activation of each component and FIG. 10B is a diagram illustrating a vehicle position and the flashing state of the lights.

FIGS. 11A and 11B are diagrams illustrating the activation of the emergency stop system upon detection of temporary accelerator operation in automatic stop control, in which FIG. 11A is a diagram illustrating the activation of each component and FIG. 11B is a diagram illustrating a vehicle position and the flashing state of the lights.

FIGS. 12A and 12B are diagrams illustrating the activation of the emergency stop system upon detection of temporary accelerator operation and detection of depression of the hazard switch in automatic stop control, in which FIG. 12A is a diagram illustrating the activation of each component and FIG. 12B is a diagram illustrating a vehicle position and the flashing state of the lights.

DETAILED DESCRIPTION

Configuration of Emergency Stop System

Figure 1:
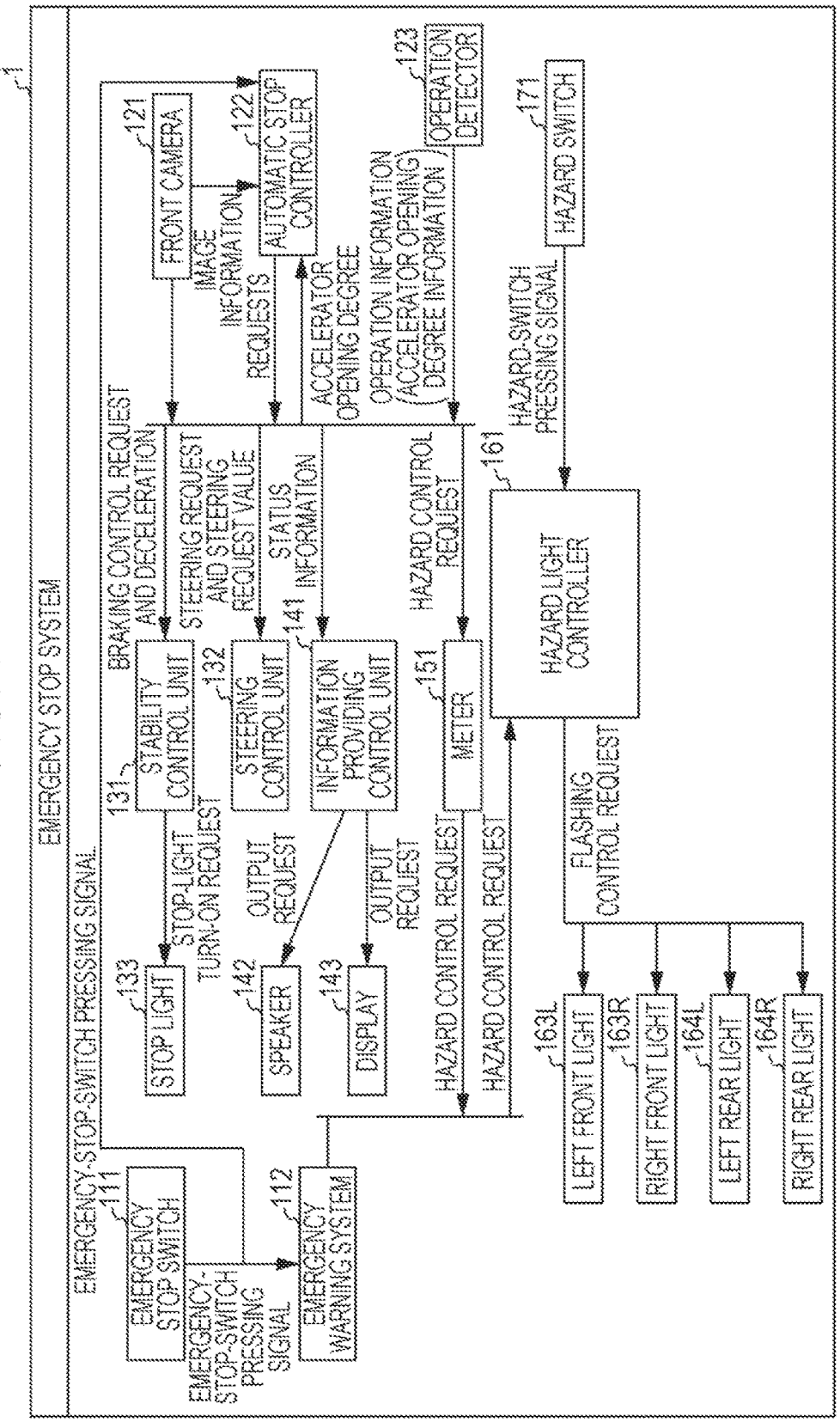
FIG. 1 is an overall configuration diagram of an emergency stop system of one embodiment.

Referring to FIG. 1, an emergency stop system 1, which is mounted in a vehicle, includes an emergency stop switch 111, an emergency warning system 112, a front camera 121, an automatic stop controller 122, an operation detector 123, a stability control unit 131, a steering control unit 132, an information providing control unit 141, a meter 151, a hazard light controller 161, and a hazard switch 171. The operation detector 123 constitutes a "driving operation detector" and an "acceleration operation detector" disclosed herein. The hazard light controller 161 constitutes a "hazard light controller" disclosed herein.

The emergency stop switch 111 is connected to the emergency warning system 112 and the automatic stop controller 122 via hard wires. The emergency stop switch 111 is configured to output an emergency-stop-switch pressing signal to the emergency warning system 112 and the automatic stop controller 122 when depression of the emergency stop switch 111 by a vehicle occupant (the driver or a passenger) is detected.

The emergency warning system 112 is connected to the emergency stop switch 111 via a hard wire.

The emergency warning system 112 is configured to place a call to an external emergency call center via a telephone communication network when an emergency-stop-switch pressing signal is input from the emergency stop switch 111, so as to allow the vehicle occupant to have a telephone conversation with the contact person at the external emergency call center.

The front camera 121 is connected to the automatic stop controller 122 via a communication cable. The front camera 121 is configured to output to the automatic stop controller 122 a captured image of an area in the direction of travel of the vehicle.

The automatic stop controller 122 is connected to the emergency stop switch 111 via a hard wire, and is connected to the front camera 121, the operation detector 123, the stability control unit 131, the steering control unit 132, the information providing control unit 141, and the meter 151 via communication cables. The automatic stop controller 122 includes a radar device (not illustrated) that monitors the presence of objects in the direction of travel of the vehicle.

The automatic stop controller 122 is implemented as an electronic control unit (ECU) or the like. The automatic stop controller 122 is configured to output a combination of a braking control request and a deceleration, a combination of a steering request and a steering request value, status information, and a hazard control request to the stability control unit 131, the steering control unit 132, the information providing control unit 141, and the meter 151, respectively, on the basis of an emergency-stop-switch pressing signal from the emergency stop switch 111, a captured image from the front camera 121, operation information from the operation detector 123, and information input from the radar device which indicates whether or not there is an object ahead of the vehicle. The ECU may include CPU which executes programs stored in a memory device to implement functions described in the embodiments of the present application. Those functions may be implemented by hardware such as a circuitry(s).

The hazard control request is a request that is output at all times and that takes four values of 0 to 3. When making a request to keep the hazard lights in a flashing state or a turned-off state, the automatic stop controller 122 outputs a hazard control request with the value "0" to the meter 151.

For example, when making a request to start flashing the hazard lights in association with the start of the execution of automatic stop control (deceleration control and steering control to make a stop) or in association with the completion of the execution of a lane change, the automatic stop controller 122 outputs a hazard control request with the value "1" (for flashing) to the meter 151.

For example, when making a request to start turning off the hazard lights in association with the completion of the execution of the automatic stop control, the automatic stop controller 122 outputs a hazard control request with the value "2" (for turn-off) to the meter 151.

For example, when making a request to temporarily stop the flashing of the hazard lights in association with the start of the execution of a lane change or in association with the interruption of the automatic stop control, the automatic stop controller 122 outputs a hazard control request with the value "3" (for temporary stop of flashing) to the meter 151.

The operation detector 123 is connected to the automatic stop controller 122 via a communication cable. The operation detector 123 is implemented as an accelerator position sensor or the like, and is configured to output operation information indicating the presence of individual operations, including accelerator opening degree information, to the automatic stop controller 122.

The stability control unit 131 is connected to the automatic stop controller 122 via a communication cable, and is connected to a stop light 133 mounted on the vehicle via a hard wire. The stability control unit 131 is configured to execute braking control of the vehicle or vehicle speed maintenance control of the vehicle on the basis of the braking control request and the deceleration input from the automatic stop controller 122. The stability control unit 131 is also configured to output a stop-light turn on request to execute control to turn on or off the stop light 133.

The steering control unit 132 is connected to the automatic stop controller 122 via a communication cable. The steering control unit 132 is configured to execute steering control of the vehicle on the basis of the steering request and the steering request value input from the automatic stop controller 122.

The information providing control unit 141 is connected to the automatic stop controller 122 via a communication cable, and is connected to a speaker 142 and a display 143, which are mounted in the vehicle, via wired cables such as analog cables. The information providing control unit 141 is configured to output a vehicle control state and a hazard light control state to the speaker 142 and the display 143 on the basis of status information input from the automatic stop controller 122. Examples of the vehicle control state include a state in which the automatic stop control has started, a state in which the automatic stop control is in progress, a state in which a lane change is in progress, and a state in which the automatic stop control has been completed. Examples of the hazard light control state include a state in which automatic flashing of the hazard lights has started, automatic flashing of the hazard lights has been temporarily stopped, and automatic flashing of the hazard lights has been completed.

The meter 151 is connected to the automatic stop controller 122 and the hazard light controller 161 via communication cables. The meter 151 provides a visual indication of the flashing state of the hazard lights in accordance with a hazard control request input from the automatic stop controller 122, and outputs to the hazard light controller 161 a hazard control request having a value identical to that of the input hazard control request.

The hazard light controller 161 is connected to the hazard switch 171 via a hard wire or the like, and is also connected to a left front light 163L, a right front light 163R, a left rear light 164L, and a right rear light 164R, which are respectively located on the left side at the front, the right side at the front, the left side at the rear, and the right side at the rear of the vehicle.

Each of the left front light 163L, the right front light 163R, the left rear light 164L, and the right rear light 164R is configured to also function as a turn signal light (or a direction indicator).

The hazard light controller 161 is implemented as an ECU or the like, and is configured to output a request for flashing each of the left front light 163L, the right front light 163R, the left rear light 164L, and the right rear light 164R or output a request for turning off each of the left front light 163L, the right front light 163R, the left rear light 164L, and the right rear light 164R ("flashing control request") in accordance with a hazard control request input from the meter 151 and a hazard-switch pressing signal input from the hazard switch 171. The ECU may include CPU which executes programs stored in a memory device to implement functions described in the embodiments of the present application. Those functions may be implemented by hardware such as a circuitry(s).

The hazard light controller 161 outputs a flashing control request with the value "0" to each of the lights 163L, 163R, 164L, and 164R to turn off each of the lights 163L, 163R, 164L, and 164R. The hazard light controller 161 outputs a flashing control request with the value "1" to each of the lights 163L, 163R, 164L, and 164R to flash each of the lights 163L, 163R, 164L, and 164R.

Further, the hazard light controller 161 stores, as an internal variable, a binary manual flashing state variable of 0 or 1 indicating a flashing state corresponding to an operation performed on the hazard switch 171.

The hazard switch 171 is connected to the hazard light controller 161 via a hard wire or the like. The hazard switch 171 is implemented as a momentary switch, and is configured to output a hazard-switch pressing signal to the hazard light controller 161 upon detection of depression of the hazard switch 171.

The hazard switch 171 outputs the value "0" to the hazard light controller 161 when no depression of the hazard switch 171 is detected, and outputs the value "1" to the hazard light controller 161 when depression of the hazard switch 171 is detected.

States of Hazard Light Controller

Next, state transitions of the hazard light controller 161 will be described with reference to FIG. 2.

Figure 2:
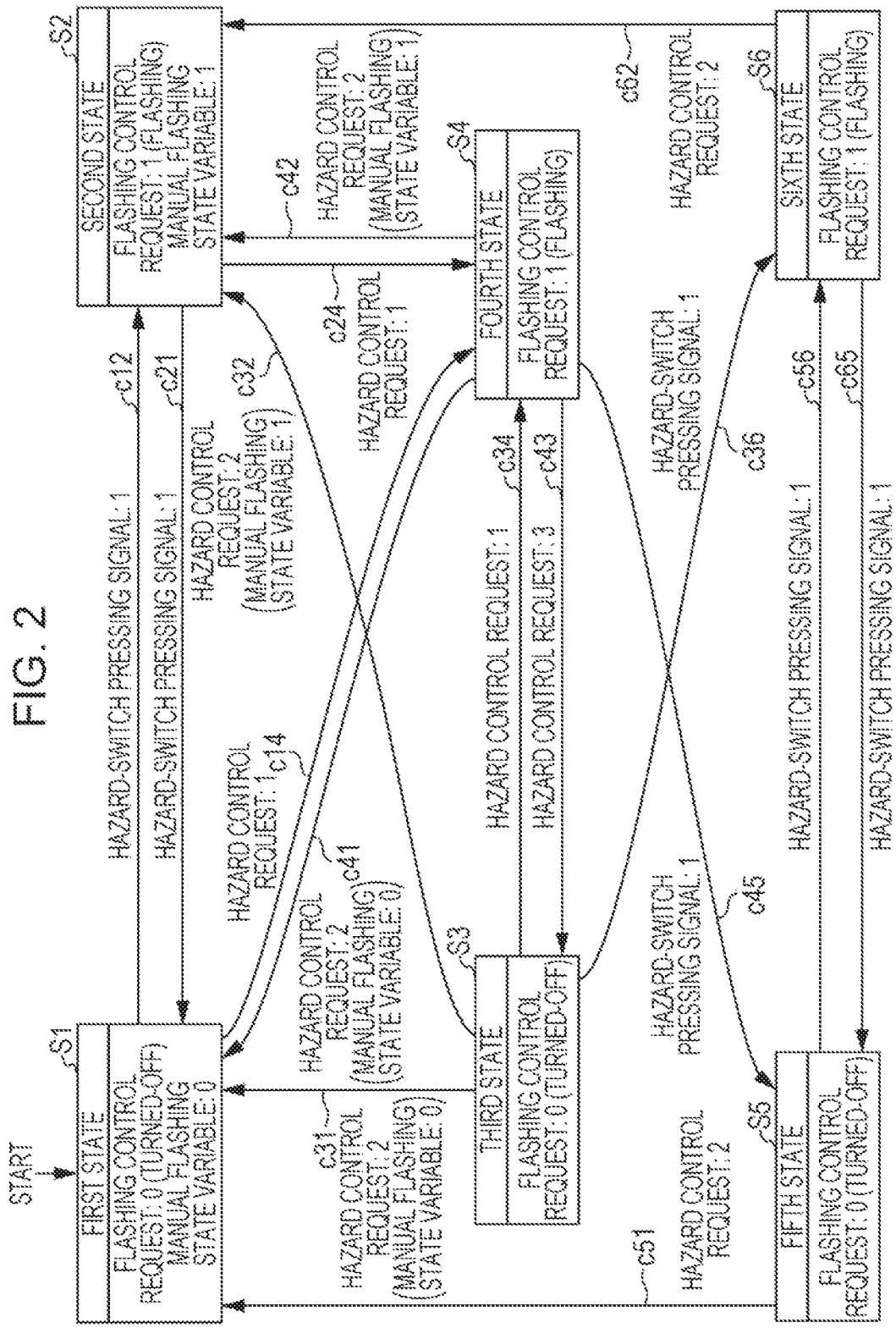
FIG. 2 is a state transition diagram of a hazard light controller of one embodiment.

As illustrated in FIG. 2, the hazard light controller 161 is configured to transition to any one of first to sixth states S1 to S6 in response to the input of a hazard-switch pressing signal and a hazard control request.

When the emergency stop system 1 is activated in association with the operation of an ignition switch of the vehicle, the hazard light controller 161 transitions to the first state S1.

The first state S1 is a state in which the lights 163L, 163R, 164L, and 164R are kept in a turned-off state while automatic stop control is not being performed. In the first state S1, the hazard light controller 161 outputs a flashing control request with the value "0" to perform control to turn off each of the lights 163L, 163R, 164L, and 164R. The hazard light controller 161 further sets the manual flashing state variable to 0.

In the first state S1, as indicated by an arrow C12, when a hazard-switch pressing signal with the value "1" is input (in other words, when the hazard switch 171 is pressed), the hazard light controller 161 transitions to the second state S2.

In the first state S1, as indicated by an arrow C14, when a hazard control request with the value "1" (for flashing) is input (in other words, when a request is made by the automatic stop controller 122 to start flashing the lights), the hazard light controller 161 transitions to the fourth state S4.

The second state S2 is a state in which the lights 163L, 163R, 164L, and 164R are kept in a flashing state while automatic stop control is not being performed. In the second state S2, the hazard light controller 161 outputs a flashing control request with the value "1" to perform control to flash each of the lights 163L, 163R, 164L, and 164R. The hazard light controller 161 further sets the manual flashing state variable to 1.

In the second state S2, as indicated by an arrow C21, when a hazard-switch pressing signal with the value "1" is input, the hazard light controller 161 transitions to the first state S1.

In the second state S2, as indicated by an arrow C24, when a hazard control request with the value "1" (for flashing) is input, the hazard light controller 161 transitions to the fourth state S4.

The third state S3 is a state in which the lights 163L, 163R, 164L, and 164R are kept in a turned-off state when an action such as a lane change is performed while automatic stop control is being performed. In the third state S3, the hazard light controller 161 outputs a flashing control request with the value "0" to perform control to turn off each of the lights 163L, 163R, 164L, and 164R.

In the third state S3, as indicated by an arrow C31, when a hazard control request with the value "2" (for turn-off) is input and the manual flashing state variable is 0, the hazard light controller 161 transitions to the first state S1.

In the third state S3, as indicated by an arrow C32, when a hazard control request with the value "2" (for turn-off) is input and the manual flashing state variable is 1, the hazard light controller 161 transitions to the second state S2.

In the third state S3, as indicated by an arrow C34, when a hazard control request with the value "1" (for flashing) is input, the hazard light controller 161 transitions to the fourth state S4. This transition is made when, for example, a lane change has been completed in automatic stop control.

In the third state S3, as indicated by an arrow C36, when a hazard-switch pressing signal with the value "1" is input (in other words, when the hazard switch 171 is pressed), the hazard light controller 161 transitions to the sixth state S6.

The fourth state S4 is a state in which the lights 163L, 163R, 164L, and 164R are kept in a flashing state when operation such as deceleration control is performed while automatic stop control is being performed. In the fourth state S4, the hazard light controller 161 outputs a flashing control request with the value "1" to perform control to flash each of the lights 163L, 163R, 164L, and 164R.

In the fourth state S4, as indicated by an arrow C41, when a hazard control request with the value "2" (for turn-off) is input and the manual flashing state variable is 0, the hazard light controller 161 transitions to the first state S1.

In the fourth state S4, as indicated by an arrow C42, when a hazard control request with the value "2" (for turn-off) is input and the manual flashing state variable is 1, the hazard light controller 161 transitions to the second state S2.

In the fourth state S4, as indicated by an arrow C43, when a hazard control request with the value "3" (for temporary stop of flashing) is input, the hazard light controller 161 transitions to the third state S3. This transition is made when, for example, a lane change is started in the automatic stop control.

In the fourth state S4, as indicated by an arrow C45, when a hazard-switch pressing signal with the value "1" is input (in other words, when the hazard switch 171 is pressed), the hazard light controller 161 transitions to the fifth state S5.

The fifth state S5 is a state in which the lights 163L, 163R, 164L, and 164R are kept in a turned-off state in response to a hazard-switch pressing signal while automatic stop control is being performed. In the fifth state S5, the hazard light controller 161 outputs a flashing control request with the value "0" to perform control to turn off each of the lights 163L, 163R, 164L, and 164R.

In the fifth state S5, as indicated by an arrow C51, when a hazard control request with the value "2" (for turn-off) is input, the hazard light controller 161 transitions to the first state S1.

In the fifth state S5, as indicated by an arrow C56, when a hazard-switch pressing signal with the value "1" is input (in other words, when the hazard switch 171 is pressed), the hazard light controller 161 transitions to the sixth state S6.

The sixth state S6 is a state in which the lights 163L, 163R, 164L, and 164R are kept in a flashing state in response to a hazard-switch pressing signal while automatic stop control is being performed. In the sixth state S6, the hazard light controller 161 outputs a flashing control request with the value "1" to perform control to flash each of the lights 163L, 163R, 164L, and 164R.

In the sixth state S6, as indicated by an arrow C62, when a hazard control request with the value "2" (for turn-off) is input, the hazard light controller 161 transitions to the second state S2.

In the sixth state S6, as indicated by an arrow C65, when a hazard-switch pressing signal with the value "1" is input (in other words, when the hazard switch 171 is pressed), the hazard light controller 161 transitions to the fifth state S5.

Relationships Between Inputs for Hazard Light Controller and Request Output from Hazard Light Controller Next, relationships between inputs (a hazard control request and a hazard-switch pressing signal) for the hazard light controller 161 and a flashing control request output from the hazard light controller 161 will be described with reference to FIGS. 3A to 3C and FIGS. 4A to 4C.

Figure 4A:
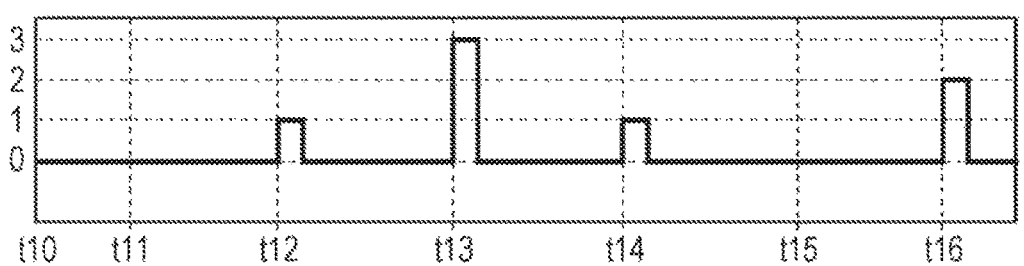
Figure 4B:
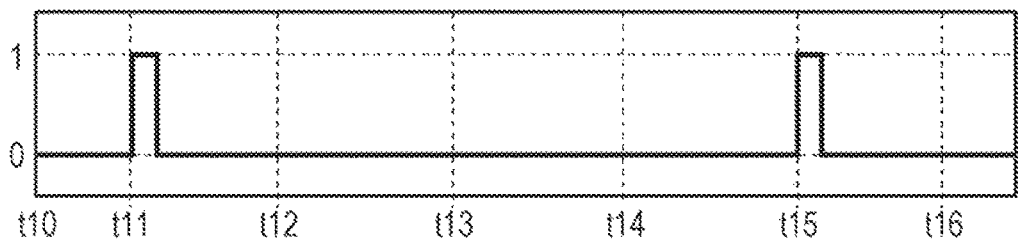
Figure 4C:
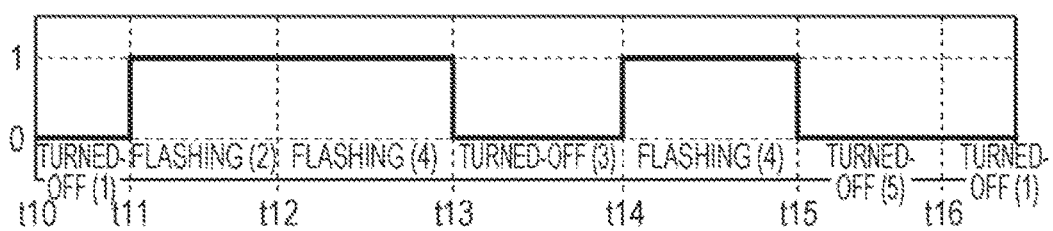

FIG. 3A and FIG. 4A are graphs with the vertical axis representing the value of the hazard control request and the horizontal axis being the time axis. FIG. 3B and FIG. 4B are graphs with the vertical axis representing the value of the hazard-switch pressing signal and the horizontal axis being the time axis. FIG. 3C and FIG. 4C are graphs with the vertical axis representing the value of the flashing control request and the horizontal axis being the time axis. The graphs illustrated in FIG. 3C and FIG. 4C also depict the state of the respective lights, which is either a flashing state or a turned-off state, at each point in time, and the state of the hazard light controller 161 is represented by a number in parentheses. In the following, the flashing control request is also referred to as "flashing control signal".

At time t0, the hazard light controller 161 is in the first state S1. In the first state S1, the hazard light controller 161 receives input of a hazard control request with the value "0" and a hazard-switch pressing signal with the value "0", and the hazard light controller 161 outputs a flashing control signal with the value "0". In the first state S1, the lights 163L, 163R, 164L, and 164R are each controlled to be turned off. The manual flashing state variable is set to 0.

At time t1, when a hazard-switch pressing signal with the value "1" is input from the hazard switch 171 (in other words, when depression of the hazard switch 171 is detected), the hazard light controller 161 transitions from the first state S1 to the second state S2 (the arrow C12 in FIG. 2) and outputs a flashing control signal with the value "1". In the second state S2, the lights 163L, 163R, 164L, and 164R are each controlled to flash. The hazard light controller 161 further sets the manual flashing state variable to 1.

At time t2, when a hazard-switch pressing signal with the value "1" is input again from the hazard switch 171 (in other words, when depression of the hazard switch 171 is detected again), the hazard light controller 161 transitions from the second state S2 to the first state S1 (the arrow C21 in FIG. 2) and outputs a flashing control signal with the value "0". In the first state S1, the lights 163L, 163R, 164L, and 164R are each controlled to be turned-off. The hazard light controller 161 further sets the manual flashing state variable to 0.

At time t3, when a hazard control request with the value "1" (for flashing) is input in association with, for example, the start of automatic stop control by the automatic stop controller 122, the hazard light controller 161 transitions from the first state S1 to the fourth state S4 (the arrow C14 in FIG. 2) and outputs a flashing control signal with the value "1". In the fourth state S4, the lights 163L, 163R, 164L, and 164R are each controlled to flash.

At time t4, when a hazard control request with the value "3" (for temporary stop of flashing) is input in association with, for example, the start of a lane change during execution of the automatic stop control by the automatic stop controller 122, the hazard light controller 161 transitions from the fourth state S4 to the third state S3 (the arrow C43 in FIG. 2) and outputs a flashing control signal with the value "0". In the third state S3, the lights 163L, 163R, 164L, and 164R are each controlled to be turned off.

At time t5, when a hazard control request with the value "1" (for flashing) is input in association with, for example, the completion of the lane change during execution of the automatic stop control by the automatic stop controller 122, the hazard light controller 161 transitions from the third state S3 to the fourth state S4 (the arrow C34 in FIG. 2) and outputs a flashing control signal with the value "1". In the fourth state S4, the lights 163L, 163R, 164L, and 164R are each controlled to flash.

At time t6, when a hazard-switch pressing signal with the value "1" is input from the hazard switch 171 (in other words, when depression of the hazard switch 171 is detected again), the hazard light controller 161 transitions from the fourth state S4 to the fifth state S5 (the arrow C45 in FIG. 2) and outputs a flashing control signal with the value "0". In the fifth state S5, the lights 163L, 163R, 164L, and 164R are each controlled to be turned off.

At time t7, when a hazard-switch pressing signal with the value "1" is input from the hazard switch 171 (in other words, when depression of the hazard switch 171 is detected again), the hazard light controller 161 transitions from the fifth state S5 to the sixth state S6 (the arrow C56 in FIG. 2) and outputs a flashing control signal with the value "1". In the sixth state S6, the lights 163L, 163R, 164L, and 164R are each controlled to flash.

At time t8, when a hazard control request with the value "2" (for turn-off) is input in association with, for example, the completion of the automatic stop control by the automatic stop controller 122, the hazard light controller 161 transitions from the sixth state S6 to the second state S2 (the arrow C62 in FIG. 2) and outputs a flashing control signal with the value "1". In the second state S2, the lights 163L, 163R, 164L, and 164R are each controlled to flash. The hazard light controller 161 further sets the manual flashing state variable to 1.

Next, relationships between inputs for the hazard light controller 161 and a request output from the hazard light controller 161 at times t10 to t16 will be described with reference to FIGS. 4A to 4C.

At time t10, the hazard light controller 161 is in the first state S1. In the first state S1, the hazard light controller 161 receives input of a hazard control request with the value "0" and a hazard-switch pressing signal with the value "0", and the hazard light controller 161 outputs a flashing control signal with the value "0". In the first state S1, the lights 163L, 163R, 164L, and 164R are each controlled to be turned off. The manual flashing state variable is set to 0.

At time t11, when a hazard-switch pressing signal with the value "1" is input from the hazard switch 171 (in other words, when depression of the hazard switch 171 is detected), the hazard light controller 161 transitions from the first state S1 to the second state S2 (the arrow C12 in FIG. 2) and outputs a flashing control signal with the value "1". In the second state S2, the lights 163L, 163R, 164L, and 164R are each controlled to flash. The hazard light controller 161 further sets the manual flashing state variable to 1.

At time t12, when a hazard control request with the value "1" (for flashing) is input in association with, for example, the start of automatic stop control by the automatic stop controller 122, the hazard light controller 161 transitions from the second state S2 to the fourth state S4 (the arrow C24 in FIG. 2) and outputs a flashing control signal with the value "1". In the fourth state S4, the lights 163L, 163R, 164L, and 164R are each controlled to flash.

At time t13, when a hazard control request with the value "3" (for temporary stop of flashing) is input in association with, for example, the start of a lane change during execution of the automatic stop control by the automatic stop controller 122, the hazard light controller 161 transitions from the fourth state S4 to the third state S3 (the arrow C43 in FIG. 2) and outputs a flashing control signal with the value "0". In the third state S3, the lights 163L, 163R, 164L, and 164R are each controlled to be turned off.

At time t14, when a hazard control request with the value "1" (for flashing) is input in association with, for example, the completion of the lane change during execution of the automatic stop control by the automatic stop controller 122, the hazard light controller 161 transitions from the third state S3 to the fourth state S4 (the arrow C34 in FIG. 2) and outputs a flashing control signal with the value "1". In the fourth state S4, the lights 163L, 163R, 164L, and 164R are each controlled to flash.

At time t15, when a hazard-switch pressing signal with the value "1" is input from the hazard switch 171 (in other words, when depression of the hazard switch 171 is detected again), the hazard light controller 161 transitions from the fourth state S4 to the fifth state S5 (the arrow C45 in FIG. 2) and outputs a flashing control signal with the value "0".

In the fifth state S5, the lights 163L, 163R, 164L, and 164R are each controlled to be turned off.

At time t16, when a hazard control request with the value "2" (for turn-off) is input in association with, for example, the completion of the automatic stop control by the automatic stop controller 122, the hazard light controller 161 transitions from the fifth state S5 to the first state S1 (the arrow C51 in FIG. 2) and outputs a flashing control signal with the value "0". In the first state S1, the lights 163L, 163R, 164L, and 164R are each controlled to be turned off. The hazard light controller 161 further sets the manual flashing state variable to 0.

Relationships Between Activation of Emergency Stop System and States of Hazard Lights Next, relationships between the activation of the emergency stop system 1 and the states of the hazard lights will be described with reference to FIGS. 5A to 12B.

Activation of Emergency Stop System in Automatic Stop Control

FIG. 5A and FIG. 5B are diagrams depicting the activation of the emergency stop system 1 in automatic stop control. In FIG. 5A and FIG. 5B, at time T101, the hazard light controller 161 is in the first state S1 and the manual flashing state variable is set to 0.

As illustrated in FIG. 5A, when depression of the emergency stop switch 111 by a vehicle occupant (the driver or a passenger) is detected (see the time T101), the emergency stop switch 111 outputs an emergency-stop-switch pressing signal to the emergency warning system 112 (see FIG. 1) and the automatic stop controller 122.

In response to the input of the emergency-stop-switch pressing signal, the emergency warning system 112 places a call to an external emergency call center.

Further, the automatic stop controller 122 refers to the accelerator opening degree information input from the operation detector 123 for a predetermined continuous-driving-difficulty determination period (for example, three seconds) to monitor the presence or absence of the accelerator operation (the time T101 to time T103). The continuous-driving-difficulty determination period is a period for determining whether or not it is difficult for the driver of the vehicle to continue to drive the vehicle. Even if it is difficult for the driver of the vehicle to continue to drive the vehicle, the passenger may continue the steering operation. In this embodiment, therefore, the automatic stop controller 122, which monitors the presence or absence of the accelerator operation, may additionally or instead monitor an amount of steering operation, for example.

The "continuous-driving-difficulty determination period" corresponds to a "first period" disclosed herein.

If the absence of the accelerator operation has been continuously detected for the continuous-driving-difficulty determination period, the automatic stop controller 122 outputs a braking control request, a deceleration, a steering request, a steering request value, a hazard control request, and so on to start automatic stop control and also to start monitoring the presence or absence of an override operation by the driver and determining the necessity of a lane change (the time T103). The term "absence of the accelerator operation", as used herein, is used to include not only the state in which the accelerator opening degree is zero but also the state in which the accelerator opening degree is less than or equal to a predetermined value.

Note that if an emergency-stop-switch pressing signal is input after the absence of the accelerator operation has been continuously detected for the continuous-driving-difficulty determination period, the automatic stop controller 122 may start braking control and steering control, described below, at the time T103 without monitoring the presence or absence of the accelerator operation. The automatic stop controller 122 may start braking control and steering control on condition that either the condition in which an emergency-stop-switch pressing signal is input or the condition in which the absence of the accelerator operation is continuously detected for the continuous-driving-difficulty determination period is met.

At the time T103, the stability control unit 131 starts the execution of braking control at the designated deceleration ("deceleration control") in accordance with the braking control request and the deceleration input from the automatic stop controller 122, and outputs a turn-on signal to the stop light 133 (see FIG. 1).

At the time T103, the steering control unit 132 performs lane-keeping control to prevent the vehicle from exiting the current lane in accordance with the steering request and the steering request value input from the automatic stop controller 122.

At the time T103, the automatic stop controller 122 outputs a hazard control request with the value "1" (for flashing) to the hazard light controller 161. In accordance with the hazard control request (for flashing), the hazard light controller 161 transitions from the first state S1 to the fourth state S4 (the arrow C14 in FIG. 2) and outputs a flashing control request with the value "1" to the lights 163L, 163R, 164L, and 164R. Each of the lights 163L, 163R, 164L, and 164R starts flashing accordingly.

When the automatic stop controller 122 determines that no lane change is necessary (time T104), the automatic stop controller 122 continuously outputs a request to the stability control unit 131 and the steering control unit 132 to cause the vehicle to come to a stop in the current lane.

At time T105, when the vehicle is able to come to a stop, each of the stability control unit 131 and the steering control unit 132 performs control to bring the vehicle to a stop with the use of an electric parking brake and to hold the vehicle in the parked state.

At time T106, when the stop control for the vehicle with the use of the electric parking brake is completed (in other words, when the automatic stop controller 122 detects the completion of the stop control for the vehicle), the automatic stop controller 122 stops the output of an automatic stop control request to terminate the automatic stop control, and outputs a hazard control request with the value "2" (for turn-off) to the hazard light controller 161. In accordance with the hazard control request (for turn-off) and the manual flashing state variable, which is 0, the hazard light controller 161 transitions from the fourth state S4 to the first state S1 (the arrow C41 in FIG. 2) and outputs a flashing control request with the value "0" to the lights 163L, 163R, 164L, and 164R. Each of the lights 163L, 163R, 164L, and 164R is turned off accordingly.

Activation of Emergency Stop System in Response to Depression of Hazard Switch Before Execution of Automatic Stop Control FIG. 6A and FIG. 6B are diagrams depicting the activation of the emergency stop system 1 in response to depression of the hazard switch 171 before the execution of automatic stop control. In FIG. 6A and FIG. 6B, at time T201, the hazard light controller 161 is in the first state S1 and the manual flashing state variable is set to 0.

As illustrated in FIG. 6A, when depression of the emergency stop switch 111 by a vehicle occupant (the driver or a passenger) is detected (see the time T201), the emergency stop switch 111 outputs an emergency-stop-switch pressing signal to the emergency warning system 112 (see FIG. 1) and the automatic stop controller 122.

In response to the input of the emergency-stop-switch pressing signal, the emergency warning system 112 places a call to an external emergency call center.

Further, the automatic stop controller 122 refers to the accelerator opening degree information input from the operation detector 123 for a predetermined continuous-driving-difficulty determination period (for example, three seconds) to monitor the presence or absence of the accelerator operation (the time T201 to time T203).

At time T202, when a hazard-switch pressing signal with the value "1" is output from the hazard switch 171 to the hazard light controller 161, the hazard light controller 161 transitions from the first state S1 to the second state S2 (the arrow C12 in FIG. 2) and outputs a flashing control request with the value "1" to the lights 163L, 163R, 164L, and 164R. As illustrated in FIG. 6B, each of the lights 163L, 163R, 164L, and 164R starts flashing accordingly. The hazard light controller 161 further sets the manual flashing state variable to 1.

If the absence of the accelerator operation has been continuously detected for the continuous-driving-difficulty determination period, the automatic stop controller 122 outputs a braking control request, a deceleration, a steering request, a steering request value, a hazard control request, and so on to start automatic stop control and also to start monitoring the presence or absence of an override operation by the driver and determining the necessity of a lane change (the time T203).

At the time T203, the automatic stop controller 122 outputs a hazard control request with the value "1" (for flashing) to the hazard light controller 161. In accordance with the hazard control request (for flashing), the hazard light controller 161 transitions from the second state S2 to the fourth state S4 (the arrow C24 in FIG. 2) and each of the lights 163L, 163R, 164L, and 164R continues to flash.

When the automatic stop controller 122 determines that no lane change is necessary (time T204), the automatic stop controller 122 continuously outputs a request to the stability control unit 131 and the steering control unit 132 to cause the vehicle to come to a stop in the current lane.

At time T205, when the vehicle is able to come to a stop, each of the stability control unit 131 and the steering control unit 132 performs control to bring the vehicle to a stop with the use of an electric parking brake and to hold the vehicle in the parked state.

At time T206, when the stop control for the vehicle with the use of the electric parking brake is completed, the automatic stop controller 122 stops the output of an automatic stop control request to terminate the automatic stop control, and outputs a hazard control request with the value "2" (for turn-off) to the hazard light controller 161. In accordance with the hazard control request (for turn-off) and the manual flashing state variable, which is 1, the hazard light controller 161 transitions from the fourth state S4 to the second state S2 (the arrow C42 in FIG. 2) and each of the lights 163L, 163R, 164L, and 164R continues to flash.

At time T207, when a hazard-switch pressing signal with the value "1" is output from the hazard switch 171 to the hazard light controller 161, the hazard light controller 161 transitions from the second state S2 to the first state S1 (the arrow C21 in FIG. 2) and outputs a flashing control request with the value "0" to the lights 163L, 163R, 164L, and 164R. Each of the lights 163L, 163R, 164L, and 164R is turned off accordingly. The hazard light controller 161 further sets the manual flashing state variable to 0.

Activation of Emergency Stop System when Automatic Stop Control Involves Lane Change FIG. 7A and FIG. 7B are diagrams depicting the activation of the emergency stop system 1 when the automatic stop control involves a lane change. In FIG. 7A and FIG. 7B, at time T111, the hazard light controller 161 is in the first state S1 and the manual flashing state variable is set to 0.

As illustrated in FIG. 7A, when depression of the emergency stop switch 111 by a vehicle occupant (the driver or a passenger) is detected (see the time T111), the emergency stop switch 111 outputs an emergency-stop-switch pressing signal to the emergency warning system 112 (see FIG. 1) and the automatic stop controller 122.

In response to the input of the emergency-stop-switch pressing signal, the emergency warning system 112 places a call to an external emergency call center.

Further, the automatic stop controller 122 refers to the accelerator opening degree information input from the operation detector 123 for a predetermined continuous-driving-difficulty determination period (for example, three seconds) to monitor the presence or absence of the accelerator operation (the time T111 to time T113).

If the absence of the accelerator operation has been continuously detected for the continuous-driving-difficulty determination period, the automatic stop controller 122 outputs a braking control request, a deceleration, a steering request, a steering request value, a hazard control request, and so on to start automatic stop control and also to start monitoring the presence or absence of an override operation by the driver and determining the necessity of a lane change (the time T113).

At the time T113, the stability control unit 131 starts the execution of braking control at the designated deceleration ("deceleration control") in accordance with the braking control request and the deceleration input from the automatic stop controller 122, and outputs a turn-on signal to the stop light 133 (see FIG. 1).

At the time T113, the steering control unit 132 performs lane-keeping control to prevent the vehicle from exiting the current lane in accordance with the steering request and the steering request value input from the automatic stop controller 122.

At the time T113, the automatic stop controller 122 outputs a hazard control request with the value "1" (for flashing) to the hazard light controller 161. In accordance with the hazard control request (for flashing), the hazard light controller 161 transitions from the first state S1 to the fourth state S4 (the arrow C14 in FIG. 2) and outputs a flashing control request with the value "1" to the lights 163L, 163R, 164L, and 164R. Each of the lights 163L, 163R, 164L, and 164R starts flashing accordingly.

When the automatic stop controller 122 determines that a lane change is necessary (time T114), the automatic stop controller 122 outputs a request to the stability control unit 131 to keep the speed of the vehicle, and outputs a lane change request to the steering control unit 132. The automatic stop controller 122 further outputs a hazard control request with the value "3" (for temporary stop of flashing) to the hazard light controller 161. The hazard light controller 161 accordingly transitions from the fourth state S4 to the third state S3 (the arrow C43 in FIG. 2) and outputs a flashing control signal with the value "0" to the lights 163L, 163R, 164L, and 164R.

Consequently, as illustrated in FIG. 7B, each of the lights 163L, 163R, 164L, and 164R temporarily stops flashing.

However, some lights (in FIG. 7B, the left front light 163L and the left rear light 164L) start flashing as turn signal lights (direction indicators).

At time T115, when the lane change is completed, the automatic stop controller 122 outputs a deceleration request and a deceleration to the stability control unit 131. The automatic stop controller 122 further outputs a lane-keeping request and a steering request value to the steering control unit 132.

Further, the automatic stop controller 122 outputs a hazard control request with the value "1" (for flashing) to the hazard light controller 161. The hazard light controller 161 accordingly transitions from the third state S3 to the fourth state S4 (the arrow C34 in FIG. 2) and outputs a flashing control signal with the value "1" to the lights 163L, 163R, 164L, and 164R.

Consequently, as illustrated in FIG. 7B, each of the lights 163L, 163R, 164L, and 164R resumes flashing.

At time T116, when the vehicle is able to come to a stop, each of the stability control unit 131 and the steering control unit 132 performs control to bring the vehicle to a stop with the use of an electric parking brake and to hold the vehicle in the parked state.

At time T117, when the stop control for the vehicle with the use of the electric parking brake is completed, the automatic stop controller 122 stops the output of an automatic stop control request to terminate the automatic stop control, and outputs a hazard control request with the value "2" (for turn-off) to the hazard light controller 161. In accordance with the hazard control request (for turn-off) and the manual flashing state variable, which is 0, the hazard light controller 161 transitions from the fourth state S4 to the first state S1 (the arrow C41 in FIG. 2) and outputs a flashing control request with the value "0" to the lights 163L, 163R, 164L, and 164R. Each of the lights 163L, 163R, 164L, and 164R is then turned off.

Activation of Emergency Stop System in Response to Depression of Hazard Switch Before Execution of Automatic Stop Control when Automatic Stop Control Involves Lane Change FIG. 8A and FIG. 8B are diagrams depicting the activation of the emergency stop system 1 in response to depression of the hazard switch 171 before the execution of automatic stop control when the automatic stop control involves a lane change. In FIG. 8A and FIG. 8B, at time T211, the hazard light controller 161 is in the first state S1 and the manual flashing state variable is set to 0.

As illustrated in FIG. 8A, when depression of the emergency stop switch 111 by a vehicle occupant (the driver or a passenger) is detected (see the time T211), the emergency stop switch 111 outputs an emergency-stop-switch pressing signal to the emergency warning system 112 (see FIG. 1) and the automatic stop controller 122.

In response to the input of the emergency-stop-switch pressing signal, the emergency warning system 112 places a call to an external emergency call center.

Further, the automatic stop controller 122 refers to the accelerator opening degree information input from the operation detector 123 for a predetermined continuous-driving-difficulty determination period (for example, three seconds) to monitor the presence or absence of the accelerator operation (the time T211 to time T213).

At time T212, when a hazard-switch pressing signal with the value "1" is output from the hazard switch 171 to the hazard light controller 161, the hazard light controller 161 transitions from the first state S1 to the second state S2 (the arrow C12 in FIG. 2) and outputs a flashing control request with the value "1" to the lights 163L, 163R, 164L, and 164R. As illustrated in FIG. 8B, each of the lights 163L, 163R, 164L, and 164R starts flashing accordingly. The hazard light controller 161 further sets the manual flashing state variable to 1.

If the absence of the accelerator operation has been continuously detected for the continuous-driving-difficulty determination period, the automatic stop controller 122 outputs a braking control request, a deceleration, a steering request, a steering request value, a hazard control request, and so on to start automatic stop control and also to start monitoring the presence or absence of an override operation by the driver and determining the necessity of a lane change (the time T213).

At the time T213, the stability control unit 131 starts the execution of braking control at the designated deceleration ("deceleration control") in accordance with the braking control request and the deceleration input from the automatic stop controller 122, and outputs a turn-on signal to the stop light 133 (see FIG. 1).

At the time T213, the steering control unit 132 performs lane-keeping control to prevent the vehicle from exiting the current lane in accordance with the steering request and the steering request value input from the automatic stop controller 122.

At the time T213, the automatic stop controller 122 outputs a hazard control request with the value "1" (for flashing) to the hazard light controller 161. In accordance with the hazard control request (for flashing), the hazard light controller 161 transitions from the second state S2 to the fourth state S4 (the arrow C24 in FIG. 2) and outputs a flashing control request with the value "1" to the lights 163L, 163R, 164L, and 164R. Each of the lights 163L, 163R, 164L, and 164R continues to flash accordingly.

When the automatic stop controller 122 determines that a lane change is necessary (time T214), the automatic stop controller 122 outputs a request to the stability control unit 131 to keep the speed of the vehicle, and outputs a lane change request to the steering control unit 132. The automatic stop controller 122 further outputs a hazard control request with the value "3" (for temporary stop of flashing) to the hazard light controller 161. The hazard light controller 161 accordingly transitions from the fourth state S4 to the third state S3 (the arrow C43 in FIG. 2) and outputs a flashing control signal with the value "0" to the lights 163L, 163R, 164L, and 164R.

Consequently, as illustrated in FIG. 8B, each of the lights 163L, 163R, 164L, and 164R temporarily stops flashing. However, some lights (in FIG. 8B, the left front light 163L and the left rear light 164L) start flashing as turn signal lights (direction indicators).

At time T215, when the lane change is completed, the automatic stop controller 122 outputs a deceleration request and a deceleration to the stability control unit 131. The automatic stop controller 122 further outputs a lane-keeping request and a steering request value to the steering control unit 132.

Further, the automatic stop controller 122 outputs a hazard control request with the value "1" (for flashing) to the hazard light controller 161. The hazard light controller 161 accordingly transitions from the third state S3 to the fourth state S4 (the arrow C34 in FIG. 2) and outputs a flashing control signal with the value "1" to the lights 163L, 163R, 164L, and 164R.

Consequently, as illustrated in FIG. 8B, each of the lights 163L, 163R, 164L, and 164R resumes flashing.

At time T216, when the vehicle is able to come to a stop, each of the stability control unit 131 and the steering control unit 132 performs control to bring the vehicle to a stop with the use of an electric parking brake and to hold the vehicle in the parked state.

At time T217, when the stop control for the vehicle with the use of the electric parking brake is completed, the automatic stop controller 122 stops the output of an automatic stop control request to terminate the automatic stop control, and outputs a hazard control request with the value "2" (for turn-off) to the hazard light controller 161. In accordance with the hazard control request (for turn-off) and the manual flashing state variable, which is 1, the hazard light controller 161 transitions from the fourth state S4 to the second state S2 (the arrow C42 in FIG. 2) and outputs a flashing control request with the value "1" to the lights 163L, 163R, 164L, and 164R. Each of the lights 163L, 163R, 164L, and 164R then continues to flash.

At time T218, when a hazard-switch pressing signal with the value "1" is output from the hazard switch 171 to the hazard light controller 161, the hazard light controller 161 transitions from the second state S2 to the first state S1 (the arrow C21 in FIG. 2) and outputs a flashing control request with the value "0" to the lights 163L, 163R, 164L, and 164R. Each of the lights 163L, 163R, 164L, and 164R is turned off accordingly. The hazard light controller 161 further sets the manual flashing state variable to 0.

Activation of Emergency Stop System Upon Detection of Continuous Accelerator Operation During Execution of Automatic Stop Control FIG. 9A and FIG. 9B are diagrams depicting the activation of the emergency stop system 1 upon detection of an accelerator operation during execution of automatic stop control. In FIG. 9A and FIG. 9B, at time T121, the hazard light controller 161 is in the first state S1 and the manual flashing state variable is set to 0.

As illustrated in FIG. 9A, when depression of the emergency stop switch 111 by a vehicle occupant (the driver or a passenger) is detected (see the time T121), the emergency stop switch 111 outputs an emergency-stop-switch pressing signal to the emergency warning system 112 (see FIG. 1) and the automatic stop controller 122.

Further, the automatic stop controller 122 refers to the accelerator opening degree information input from the operation detector 123 for a predetermined continuous-driving-difficulty determination period (for example, three seconds) to monitor the presence or absence of the accelerator operation (the time T121 to time T122).

If the absence of the accelerator operation has been continuously detected for the continuous-driving-difficulty determination period, the automatic stop controller 122 outputs a braking control request, a deceleration, a steering request, a steering request value, a hazard control request, and so on to start automatic stop control and also to start monitoring the presence or absence of an override operation by the driver and determining the necessity of a lane change (the time T122).

At the time T122, the stability control unit 131 starts the execution of braking control at the designated deceleration ("deceleration control") in accordance with the braking control request and the deceleration input from the automatic stop controller 122, and outputs a turn-on signal to the stop light 133 (see FIG. 1).

At the time T122, the steering control unit 132 performs lane-keeping control to prevent the vehicle from exiting the current lane in accordance with the steering request and the steering request value input from the automatic stop controller 122.

At the time T122, the automatic stop controller 122 outputs a hazard control request with the value "1" (for flashing) to the hazard light controller 161. In accordance with the hazard control request (for flashing), the hazard light controller 161 transitions from the first state S1 to the fourth state S4 (the arrow C14 in FIG. 2) and outputs a flashing control request with the value "1" to the lights 163L, 163R, 164L, and 164R. As illustrated in FIG. 9B, each of the lights 163L, 163R, 164L, and 164R starts flashing accordingly.

When the operation detector 123 detects an accelerator operation (time T124), the automatic stop controller 122 outputs a request to the stability control unit 131 to interrupt the deceleration control.

Further, the automatic stop controller 122 outputs a hazard control request with the value "3" (for temporary stop of flashing) to the hazard light controller 161. In accordance with the hazard control request (for temporary stop of flashing), the hazard light controller 161 transitions from the fourth state S4 to the third state S3 (the arrow C43 in FIG. 2) and outputs a flashing control request with the value "0" to the lights 163L, 163R, 164L, and 164R. As illustrated in FIG. 9B, each of the lights 163L, 163R, 164L, and 164R is turned off accordingly.

At time T125, if the accelerator operation has been continuously detected by the operation detector 123 for a predetermined driving intention confirmation period (for example, four seconds), the automatic stop controller 122 makes a request to the steering control unit 132 to cancel the lane-keeping control. The driving intention confirmation period is a period for confirming the intention to drive the vehicle. The driving intention confirmation period corresponds to a "second period", a "third period", and a "fourth period" disclosed herein.

Further, the automatic stop controller 122 outputs a hazard control request with the value "2" (for turn-off) to the hazard light controller 161. In accordance with the hazard control request (for turn-off) and the manual flashing state variable, which is 0, the hazard light controller 161 transitions from the third state S3 to the first state S1 (the arrow C31 in FIG. 2) and outputs a flashing control request with the value "0" to the lights 163L, 163R, 164L, and 164R. As illustrated in FIG. 9B, each of the lights 163L, 163R, 164L, and 164R continues to be turned off accordingly.

Activation of Emergency Stop System Upon Detection of Operation of Hazard Switch and Detection of Continuous Accelerator Operation During Execution of Automatic Stop Control FIG. 10A and FIG. 10B are diagrams depicting the activation of the emergency stop system 1 upon detection of an operation of the hazard switch 171 and detection of a continuous accelerator operation during execution of automatic stop control. In FIG. 10A and FIG. 10B, at time T221, the hazard light controller 161 is in the first state S1 and the manual flashing state variable is set to 0.

As illustrated in FIG. 10A, when depression of the emergency stop switch 111 by a vehicle occupant (the driver or a passenger) is detected (see the time T221), the emergency stop switch 111 outputs an emergency-stop-switch pressing signal to the emergency warning system 112 (see FIG. 1) and the automatic stop controller 122.

Further, the automatic stop controller 122 refers to the accelerator opening degree information input from the operation detector 123 for a predetermined continuousdriving-difficulty determination period (for example, three seconds) to monitor the presence or absence of the accelerator operation (the time T221 to time T222).

If the absence of the accelerator operation has been continuously detected for the continuous-driving-difficulty determination period, the automatic stop controller 122 outputs a braking control request, a deceleration, a steering request, a steering request value, a hazard control request, and so on to start automatic stop control and also to start monitoring the presence or absence of an override operation by the driver and determining the necessity of a lane change (the time T222).

At the time T222, the stability control unit 131 starts the execution of braking control at the designated deceleration ("deceleration control") in accordance with the braking control request and the deceleration input from the automatic stop controller 122, and outputs a turn-on signal to the stop light 133 (see FIG. 1).

At the time T222, the steering control unit 132 performs lane-keeping control to prevent the vehicle from exiting the current lane in accordance with the steering request and the steering request value input from the automatic stop controller 122.

At the time T222, the automatic stop controller 122 outputs a hazard control request with the value "1" (for flashing) to the hazard light controller 161. In accordance with the hazard control request (for flashing), the hazard light controller 161 transitions from the first state S1 to the fourth state S4 (the arrow C14 in FIG. 2) and outputs a flashing control request with the value "1" to the lights 163L, 163R, 164L, and 164R. As illustrated in FIG. 10B, each of the lights 163L, 163R, 164L, and 164R starts flashing accordingly.

At time T223, for example, when depression of the hazard switch 171 by the vehicle driver who wishes to resume driving the vehicle is detected, the hazard switch 171 outputs a hazard-switch pressing signal with the value "1" to the hazard light controller 161. In accordance with the hazard-switch pressing signal, the hazard light controller 161 transitions from the fourth state S4 to the fifth state S5 (the arrow C45 in FIG. 2) and outputs a flashing control request with the value "0" to the lights 163L, 163R, 164L, and 164R. As illustrated in FIG. 10B, each of the lights 163L, 163R, 164L, and 164R is turned off accordingly.

When the operation detector 123 detects an accelerator operation (time T224), the automatic stop controller 122 outputs a request to the stability control unit 131 to interrupt the deceleration control.

Further, the automatic stop controller 122 outputs a hazard control request with the value "3" (for temporary stop of flashing) to the hazard light controller 161. Even when the hazard control request (for temporary stop of flashing) is input, the hazard light controller 161 is still in the fifth state S5 and continuously outputs a flashing control request with the value "0" to the lights 163L, 163R, 164L, and 164R. As illustrated in FIG. 10B, each of the lights 163L, 163R, 164L, and 164R continues to be turned off accordingly.

At time T225, if the accelerator operation has been continuously detected by the operation detector 123 for a predetermined driving intention confirmation period (for example, four seconds), the automatic stop controller 122 makes a request to the steering control unit 132 to cancel the lane-keeping control.

Further, the automatic stop controller 122 outputs a hazard control request with the value "2" (for turn-off) to the hazard light controller 161. In accordance with the hazard control request (for turn-off), the hazard light controller 161 transitions from the fifth state S5 to the first state S1 (the arrow C51 in FIG. 2) and outputs a flashing control request with the value "0" to the lights 163L, 163R, 164L, and 164R. As illustrated in FIG. 10B, each of the lights 163L, 163R, 164L, and 164R continues to be turned off accordingly.

Activation of Emergency Stop System Upon Detection of Temporary Accelerator Operation During Execution of Automatic Stop Control FIG. 11A and FIG. 11B are diagrams depicting the activation of the emergency stop system 1 upon detection of a temporary accelerator operation during execution of automatic stop control. In FIG. 11A and FIG. 11B, at time T131, the hazard light controller 161 is in the first state S1 and the manual flashing state variable is set to 0.

As illustrated in FIG. 11A, when depression of the emergency stop switch 111 by a vehicle occupant (the driver or a passenger) is detected (see the time T131), the emergency stop switch 111 outputs an emergency-stop-switch pressing signal to the emergency warning system 112 (see FIG. 1) and the automatic stop controller 122.

Further, the automatic stop controller 122 refers to the accelerator opening degree information input from the operation detector 123 for a predetermined continuous-driving-difficulty determination period (for example, three seconds) to monitor the presence or absence of the accelerator operation (the time T131 to time T132).

If the absence of the accelerator operation has been continuously detected for the continuous-driving-difficulty determination period, the automatic stop controller 122 outputs a braking control request, a deceleration, a steering request, a steering request value, a hazard control request, and so on to start automatic stop control and also to start monitoring the presence or absence of an override operation by the driver and determining the necessity of a lane change (the time T132).

At the time T132, the stability control unit 131 starts the execution of braking control at the designated deceleration ("deceleration control") in accordance with the braking control request and the deceleration input from the automatic stop controller 122, and outputs a turn-on signal to the stop light 133 (see FIG. 1).

At the time T132, the steering control unit 132 performs lane-keeping control to prevent the vehicle from exiting the current lane in accordance with the steering request and the steering request value input from the automatic stop controller 122.

At the time T132, the automatic stop controller 122 outputs a hazard control request with the value "1" (for flashing) to the hazard light controller 161. In accordance with the hazard control request (for flashing), the hazard light controller 161 transitions from the first state S1 to the fourth state S4 (the arrow C14 in FIG. 2) and outputs a flashing control request with the value "1" to the lights 163L, 163R, 164L, and 164R. As illustrated in FIG. 11B, each of the lights 163L, 163R, 164L, and 164R starts flashing accordingly.

When the operation detector 123 detects an accelerator operation (time T133), the automatic stop controller 122 outputs a request to the stability control unit 131 to interrupt the deceleration control.

Further, the automatic stop controller 122 outputs a hazard control request with the value "3" (for temporary stop of flashing) to the hazard light controller 161. In accordance with the hazard control request (for temporary stop of flashing), the hazard light controller 161 transitions from the fourth state S4 to the third state S3 (the arrow C43 in FIG. 2) and outputs a flashing control request with the value "0"

to the lights 163L, 163R, 164L, and 164R. As illustrated in FIG. 11B, each of the lights 163L, 163R, 164L, and 164R is turned off accordingly.

At time T135, if the operation detector 123 has detected the accelerator operation for a period less than a predetermined driving intention confirmation period, the automatic stop controller 122 makes a request to the stability control unit 131 to resume deceleration control.

Further, the automatic stop controller 122 outputs a hazard control request with the value "1" (for flashing) to the hazard light controller 161. In accordance with the hazard control request (for flashing), the hazard light controller 161 transitions from the third state S3 to the fourth state S4 (the arrow C34 in FIG. 2) and outputs a flashing control request with the value "1" to the lights 163L, 163R, 164L, and 164R. As illustrated in FIG. 11B, each of the lights 163L, 163R, 164L, and 164R resumes flashing accordingly.

At time T136, when the vehicle is able to come to a stop, each of the stability control unit 131 and the steering control unit 132 performs control to bring the vehicle to a stop with the use of an electric parking brake and to hold the vehicle in the parked state.

At time T137, when the stop control for the vehicle with the use of the electric parking brake is completed, the automatic stop controller 122 stops the output of an automatic stop control request to terminate the automatic stop control, and outputs a hazard control request with the value "2" (for turn-off) to the hazard light controller 161. In accordance with the hazard control request (for turn-off) and the manual flashing state variable, which is 0, the hazard light controller 161 transitions from the fourth state S4 to the first state S1 (the arrow C41 in FIG. 2) and outputs a flashing control request with the value "0" to the lights 163L, 163R, 164L, and 164R. As illustrated in FIG. 11B, each of the lights 163L, 163R, 164L, and 164R is then turned off.

Activation of Emergency Stop System Upon Detection of Temporary Accelerator Operation and Detection of Depression of Hazard Switch During Execution of Automatic Stop Control FIG. 12A and FIG. 12B are diagrams depicting the activation of the emergency stop system 1 upon detection of a temporary accelerator operation and detection of depression of the hazard switch 171 during execution of automatic stop control. In FIG. 12A and FIG. 12B, at time T231, the hazard light controller 161 is in the first state S1 and the manual flashing state variable is set to 0.

As illustrated in FIG. 12A, when depression of the emergency stop switch 111 by a vehicle occupant (the driver or a passenger) is detected (see the time T231), the emergency stop switch 111 outputs an emergency-stop-switch pressing signal to the emergency warning system 112 (see FIG. 1) and the automatic stop controller 122.

Further, the automatic stop controller 122 refers to the accelerator opening degree information input from the operation detector 123 for a predetermined continuous-driving-difficulty determination period (for example, three seconds) to monitor the presence or absence of the accelerator operation (the time T231 to time T232).

If the absence of the accelerator operation has been continuously detected for the continuous-driving-difficulty determination period, the automatic stop controller 122 outputs a braking control request, a deceleration, a steering request, a steering request value, a hazard control request, and so on to start automatic stop control and also to start monitoring the presence or absence of an override operation by the driver and determining the necessity of a lane change (the time T232).

At the time T232, the stability control unit 131 starts the execution of braking control at the designated deceleration ("deceleration control") in accordance with the braking control request and the deceleration input from the automatic stop controller 122, and outputs a turn-on signal to the stop light 133 (see FIG. 1).

At the time T232, the steering control unit 132 performs lane-keeping control to prevent the vehicle from exiting the current lane in accordance with the steering request and the steering request value input from the automatic stop controller 122.

At the time T232, the automatic stop controller 122 outputs a hazard control request with the value "1" (for flashing) to the hazard light controller 161. In accordance with the hazard control request (for flashing), the hazard light controller 161 transitions from the first state S1 to the fourth state S4 (the arrow C14 in FIG. 2) and outputs a flashing control request with the value "1" to the lights 163L, 163R, 164L, and 164R. As illustrated in FIG. 12B, each of the lights 163L, 163R, 164L, and 164R starts flashing accordingly.

When the operation detector 123 detects an accelerator operation (time T233), the automatic stop controller 122 outputs a request to the stability control unit 131 to interrupt the deceleration control.

Further, the automatic stop controller 122 outputs a hazard control request with the value "3" (for temporary stop of flashing) to the hazard light controller 161. In accordance with the hazard control request (for temporary stop of flashing), the hazard light controller 161 transitions from the fourth state S4 to the third state S3 (the arrow C43 in FIG. 2) and outputs a flashing control request with the value "0" to the lights 163L, 163R, 164L, and 164R. As illustrated in FIG. 12B, each of the lights 163L, 163R, 164L, and 164R is turned off accordingly.

At time T234, for example, when depression of the hazard switch 171 by the vehicle driver who wishes to interrupt the accelerator operation is detected, the hazard switch 171 outputs a hazard-switch pressing signal with the value "1" to the hazard light controller 161. In accordance with the hazard-switch pressing signal, the hazard light controller 161 transitions from the third state S3 to the sixth state S6 (the arrow C36 in FIG. 2) and outputs a flashing control request with the value "1" to the lights 163L, 163R, 164L, and 164R. As illustrated in FIG. 12B, each of the lights 163L, 163R, 164L, and 164R resumes flashing accordingly.

At time T235, if the operation detector 123 has detected the accelerator operation for a period less than a predetermined driving intention confirmation period, the automatic stop controller 122 makes a request to the stability control unit 131 to resume deceleration control.

Further, the automatic stop controller 122 outputs a hazard control request with the value "1" (for flashing) to the hazard light controller 161. In accordance with the hazard control request (for flashing), the hazard light controller 161 does not transition from the sixth state S6 and continuously outputs a flashing control request with the value "1" to the lights 163L, 163R, 164L, and 164R. As illustrated in FIG. 12B, each of the lights 163L, 163R, 164L, and 164R continues to flash accordingly.

At time T236, when the vehicle is able to come to a stop, each of the stability control unit 131 and the steering control unit 132 performs control to bring the vehicle to a stop with the use of an electric parking brake and to hold the vehicle in the parked state.

At time T237, when the stop control for the vehicle with the use of the electric parking brake is completed, the automatic stop controller 122 stops the output of an automatic stop control request to terminate the automatic stop control, and outputs a hazard control request with the value "2" (for turn-off) to the hazard light controller 161. In accordance with the hazard control request (for turn-off), the hazard light controller 161 transitions from the sixth state S6 to the second state S2 (the arrow C62 in FIG. 2) and outputs a flashing control request with the value "1" to the lights 163L, 163R, 164L, and 164R. Each of the lights 163L, 163R, 164L, and 164R then continues to flash.

At time T238, when a hazard-switch pressing signal with the value "1" is output from the hazard switch 171 to the hazard light controller 161, the hazard light controller 161 transitions from the second state S2 to the first state S1 (the arrow C21 in FIG. 2) and outputs a flashing control request with the value "0" to the lights 163L, 163R, 164L, and 164R. Each of the lights 163L, 163R, 164L, and 164R is turned off accordingly. The hazard light controller 161 further sets the manual flashing state variable to 0.

Operation and Advantages of this Embodiment

In the emergency stop system 1, while automatic stop control is not being performed, the hazard light controller 161 allows each of the lights 163L, 163R, 164L, and 164R to be switched between a flashing state (the second state S2) and a turned-off state (the first state S1) each time the hazard switch 171 is pressed. Since the hazard switch 171 is implemented as a momentary switch, the hazard switch 171 is kept in a free state regardless of whether the hazard lights are in the flashing state (the second state S2) or in the turned-off state (the first state S1).

In addition, when the hazard lights are controlled to be in the flashing state by the hazard light controller 161 (see C14 and C24 in FIG. 2) in response to the execution of automatic stop control by the automatic stop controller 122, similarly to when each of the lights 163L, 163R, 164L, and 164R is in the flashing state while automatic stop control is not being performed, the hazard switch 171 is in a free state. This results in elimination or reduction of the awkward feeling that the user experiences because the state of the hazard switch 171 and the flashing state of the lights 163L, 163R, 164L, and 164R are contrary to what is expected by the user.

In addition, the hazard light controller 161 allows each of the lights 163L, 163R, 164L, and 164R to be turned off by a one-time depression of the hazard switch 171 (see C45 in FIG. 2). Also in this case, similarly to when each of the lights 163L, 163R, 164L, and 164R is in the turned-off state while automatic stop control is not being performed, the hazard switch 171 is in a free state. This allows elimination or reduction of the awkward feeling that the user experiences for the state of the hazard switch and allows elimination or reduction of inconvenience that the user incurs for the hazard switch when turning off the hazard lights.

As described above, the emergency stop system 1 allows elimination or reduction of the user's awkward feeling and inconvenience even when the user performs an operation during the flashing of each of the lights 163L, 163R, 164L, and 164R which is involved in a process for bringing the vehicle to an automatic stop.

In the emergency stop system 1, furthermore, the automatic stop controller 122 performs automatic stop control on condition that the emergency stop switch 111 has been operated (T103 in FIG. 5A, T203 in FIG. 6A, T113 in FIG. 7A, T213 in FIG. 8A, T122 in FIG. 9A, T222 in FIG. 10A, T132 in FIG. 11A, T232 in FIG. 12A). This allows the intention of the user to be reflected when automatic stop control is performed.

In some cases, such as when the emergency stop switch 111 has been pressed unintentionally due to an operation error or the like but the user does not recognize the depression of the emergency stop switch 111 or when the user wishes to temporarily continue to drive the vehicle although the user has intentionally pressed the emergency stop switch 111, the user may wish to turn off the hazard lights (for example, the time T223 in FIG. 10A). In such cases, the user may attempt to turn off the hazard lights by using the hazard switch 171. As described above, the hazard lights are turned off with a single operation of the hazard switch (the time T223 in FIG. 10A).

In the emergency stop system 1, furthermore, the automatic stop controller 122 performs automatic stop control on condition that the absence of the predetermined driving operation is continuously detected by the operation detector 123 for a predetermined continuous-driving-difficulty determination period.

However, even during execution of the automatic stop control, the user (the vehicle driver) may wish to turn off the hazard lights by using the hazard switch 171 in some cases such as when the user wishes to resume the driving operation. Also in such cases, in the emergency stop system 1, a one-time depression of hazard switch allows the hazard light controller 161 to turn off the hazard lights (the time T223 in FIG. 10A).

In the emergency stop system 1, furthermore, if the presence of the predetermined driving operation is continuously detected by the operation detector 123 for a predetermined driving intention confirmation period during execution of the automatic stop control (T225 in FIG. 10A), the automatic stop control is terminated. If the driving operation detected by the operation detector 123 continues for a predetermined driving intention confirmation period during execution of the automatic stop control, the vehicle driver is more likely to have a driving intention. Thus, by terminating the automatic stop control, it may be possible to achieve the control intended by the vehicle driver.

In some cases, furthermore, the user attempts to turn off the hazard lights by using the hazard switch 171 before or after the resumption of driving of the vehicle (T223 in FIG. 10A). In such cases, the hazard light controller 161 causes the hazard lights to be turned off in response to a one-time depression of the hazard switch 171 (T223 in FIG. 10A). This allows elimination or reduction of the awkward feeling that the user experiences.

While the hazard lights are flashing in accordance with automatic stop control, if the automatic stop control is completed, in many case, it is predicted that the flashing of the hazard lights will no longer be necessary. Thus, even if the hazard light controller 161 terminates the flashing of the hazard lights in response to the completion of the automatic stop control (the time T106 in FIG. 5A, the time T117 in FIG. 7A, and the time T137 in FIG. 11A), the user will not feel very awkward.

In contrast, if the user presses the hazard switch 171 to bring the hazard lights into the flashing state, it is predicted that the user will wish to flash the hazard lights regardless of the execution of automatic stop control. The hazard light controller 161 causes the hazard lights to continue to flash even after the automatic stop control has been completed (the time T206 in FIG. 6A, the time T217 in FIG. 8A, the time T237 in FIG. 12A), thus reducing or preventing the awkward feeling that the user experiences.

In addition, when a lane change is performed, it is predicted that the user will expect that the flashing of the hazard lights will be stopped. To address this situation, in the emergency stop system 1 according to this embodiment, the hazard light controller 161 turns off the hazard lights if a lane change is performed during execution of the automatic stop control (the time T114 in FIG. 7A and the time T214 in FIG. 8A).

In contrast, when the lane change is completed, it is predicted that the user will expect that the flashing of the hazard lights will be resumed. To address this situation, in the emergency stop system 1 having the configuration described above, the hazard light controller 161 causes the hazard lights to flash after the lane change has been completed (the time T115 in FIG. 7A and the time T215 in FIG. 8A).

Consequently, the hazard lights operate, as expected by the user, when a lane change is performed. This may eliminate or reduce the awkward feeling that the user experiences.

In the emergency stop system 1, in response to an accelerator operation being detected by the operation detector 123 during execution of the automatic stop control, the automatic stop controller 122 interrupts the automatic stop control and the hazard light controller 161 turns off the hazard lights (the time T124 in FIG. 9A, the time T224 in FIG. 10A, the time T133 in FIG. 11A, and the time T233 in FIG. 12A). This allows the user and occupants of other vehicles to recognize interruption of the automatic stop control.

In addition, if the accelerator operation continues for a driving intention confirmation period or longer, it is predicted that the accelerator operation is an operation based on the driving intention of the vehicle driver, whereas, if the duration of the accelerator operation is less than the driving intention confirmation period, it is difficult to determine whether or not the acceleration operation is based on the driving intention of the driver. To address this situation, the automatic stop controller 122 performs control to terminate the automatic stop control or to resume the automatic stop control in accordance with whether or not the acceleration operation continues for the driving intention confirmation period or longer (the time T125 in FIG. 9A, the time T225 in FIG. 10A, the time T135 in FIG. 11A, and the time T235 in FIG. 12A). Thus, the control intended by the vehicle driver is achievable.

Furthermore, the hazard light controller 161 causes the hazard lights to resume flashing in response to the resumption of the automatic stop control (the time T135 in FIG. 11A). This allows the user and occupants of other nearby vehicles to recognize the resumption of the automatic stop control.

As described above, the emergency stop system having the configuration described above allows the driving intention of the user to be reflected and allows the hazard lights to be controlled to flash or stop flashing in accordance with the state of the execution of automatic stop control. This allows the user and occupants of other vehicles to recognize the state of the execution of automatic stop control.

In the emergency stop system 1 having the configuration described above, when the hazard switch 171 is pressed even though the hazard lights have been turned off in association with automatic stop control (the time T234 in FIG. 12A), it is predicted that the user will have an intention to resume flashing the hazard lights. To address this situation, the hazard light controller 161 resumes flashing the hazard lights. Thus, the hazard lights are controlled to flash in accordance with the user's intention.

Modifications

In the foregoing embodiment, the automatic stop controller 122 causes the hazard lights to be automatically turned off (outputs a hazard control request (for turn-off) to the hazard light controller 161) in response to the completion of the automatic stop control when the parking of the vehicle has been completed (T106 in FIG. 5A, T206 in FIG. 6A, T117 in FIG. 7A, T217 in FIG. 8A, T137 in FIG. 11A, and T237 in FIG. 12A). Alternatively, the automatic stop controller 122 may cause the hazard lights to continue to flash, without automatically turning off the hazard lights, after the completion of the automatic stop control when the parking of the vehicle has been completed. In this case, the hazard light controller 161 continues flashing of the hazard lights until the hazard switch 171 is pressed.

In the foregoing embodiment, the automatic stop controller 122 starts determination as to whether or not it is difficult to continue to drive the vehicle after the detection of depression of the emergency stop switch 111 (T101 in FIG. 5A, T201 in FIG. 6A, T111 in FIG. 7A, T211 in FIG. 8A, T121 in FIG. 9A, T221 in FIG. 10A, T131 in FIG. 11A, and T231 in FIG. 12A), and, after it has been determined that it is difficult to continue to drive the vehicle, the automatic stop controller 122 starts deceleration control and causes the hazard lights to automatically flash (outputs a hazard control request (for flashing) to the hazard light controller 161) (T103 in FIG. 5A, T203 in FIG. 6A, T113 in FIG. 7A, T213 in FIG. 8A, T122 in FIG. 9A, T222 in FIG. 10A, T132 in FIG. 11A, and T232 in FIG. 12A).

Alternatively, the automatic stop controller 122 may start determination as to whether or not it is difficult to continue to drive the vehicle and start deceleration control with comparatively weak deceleration (deceleration at a comparatively low deceleration) after detection of depression of the emergency stop switch 111. In addition, after it has been determined that it is difficult to continue to drive the vehicle, the automatic stop controller 122 may start deceleration control with comparatively strong deceleration (deceleration at a comparatively high deceleration). In this case, the automatic stop controller 122 may cause the hazard lights to automatically flash (output a hazard control request (for flashing) to the hazard light controller 161) together with the start of comparatively weak deceleration. Alternatively, the automatic stop controller 122 may not cause the hazard lights to flash (may continue outputting a hazard control request (for keeping) to the hazard light controller 161) during the comparatively weak deceleration, and may cause the hazard lights to automatically flash (output a hazard control request (for flashing) to the hazard light controller 161) after the transition to comparatively strong deceleration.

In the foregoing embodiment, the automatic stop controller 122 starts automatic stop control by requiring the detection of depression of the emergency stop switch 111. Alternatively, even if depression of the emergency stop switch 111 has not been detected, the automatic stop controller 122 may start automatic stop control when the absence of the driving operation is continuously detected for a predetermined period. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. An emergency stop system comprising:
a hazard switch that is a momentary switch configured to provide an instruction to flash or turn off hazard lights of a vehicle;
an automatic stop controller that performs automatic stop control for causing the vehicle to automatically stop when a predetermined condition is met; and
a hazard light controller that controls the hazard lights to:
switch the hazard lights between a flashing state and a turned-off state each time the hazard switch is pressed by a user while the automatic stop control is not being performed,
to bring the hazard lights into the flashing state upon start of the automatic stop control, and
to turn off the hazard lights upon depression of the hazard switch while the hazard lights are flashing during execution of the automatic stop control,
wherein the hazard light controller turns off the hazard lights upon depression of the hazard switch while the hazard lights are flashing even if the automatic stop control is being performed.

2. The emergency stop system according to claim 1, further comprising an emergency stop switch provided separately from the hazard switch,
wherein the predetermined condition includes a condition in which the emergency stop switch is pressed.

3. The emergency stop system according to claim 1, further comprising a driving operation detector that detects a presence or absence of a predetermined driving operation of the vehicle,
wherein the predetermined condition includes a condition in which the absence of the predetermined driving operation is continuously detected by the driving operation detector for a predetermined first period.

4. The emergency stop system according to claim 1, further comprising a driving operation detector that detects a presence or absence of a predetermined driving operation of the vehicle,
wherein the automatic stop controller terminates the automatic stop control in a case where the presence of the predetermined driving operation is continuously detected by the driving operation detector for a predetermined second period during execution of the automatic stop control.

5. The emergency stop system according to claim 1, wherein the hazard light controller
causes the hazard lights to be turned off upon completion of the automatic stop control in a case where the hazard lights are brought into the flashing state in accordance with the automatic stop control, and
continues the flashing state of the hazard lights after completion of the automatic stop control in a case where the hazard lights are brought into the flashing state in response to depression of the hazard switch before start of the automatic stop control or during execution of the automatic stop control.

6. The emergency stop system according to claim 1, wherein the hazard light controller is configured to turn off the hazard lights when the automatic stop controller starts execution of predetermined control during execution of the automatic stop control, and to cause the hazard lights to resume flashing upon completion of the predetermined control during execution of the automatic stop control.

7. The emergency stop system according to claim 6, wherein the predetermined control comprises a lane change that involves causing turn signal lights of the vehicle to flash.

8. The emergency stop system according to claim 1, further comprising an acceleration operation detector that detects an acceleration operation of the vehicle,
wherein the automatic stop controller is configured to interrupt the automatic stop control in a case where the acceleration operation is detected by the acceleration operation detector during execution of the automatic stop control,
wherein the automatic stop controller is configured to terminate the automatic stop control in a case where the acceleration operation is continuously detected by the acceleration operation detector for a predetermined third period or longer after interruption of the automatic stop control, and
resume the automatic stop control in a case where the acceleration operation is no longer detected by the acceleration operation detector before the third period elapses after interruption of the automatic stop control, and
wherein the hazard light controller is configured to turn off the hazard lights during interruption of the automatic stop control, and to cause the hazard lights to resume flashing in response to resumption of the automatic stop control.

9. The emergency stop system according to claim 8, wherein the hazard light controller brings the hazard lights into the flashing state upon depression of the hazard switch while the hazard lights are turned off by interruption of the automatic stop control.

10. The emergency stop system according to claim 1, wherein the hazard light controller stores a status indicator indicating a flashing instruction of the hazard lights and a turn-off instruction of the hazard lights, and
the hazard light controller switches the status indicator between the flashing instruction and the turn-off instruction each time the hazard switch is pressed.

11. The emergency stop system according to claim 10, wherein the automatic stop controller sends to the hazard light controller an instruction signal indicating a status of the hazard lights, and
the hazard light controller controls the hazard lights by using combination of the instruction signal and the status indicator.

12. The emergency stop system according to claim 11, wherein the instruction signal includes a flashing request, a temporary stop of flashing request, a turn-off of flashing request.

13. The emergency stop system according to claim 12, wherein the instruction signal further includes a keeping an existing state of flashing or turn-off request.

14. The emergency stop system according to claim 1, wherein the momentary switch is configured to, when the momentary switch is pressed while in a free state with being in a released position, temporarily transition to an operating state with being in a depressed position and then return to the free state such that the hazard switch is held in the free state when the hazard switch is not being operated by the user, regardless of whether the hazard lights are in a flashing state or a turned-off state.

15. An emergency stop method performed by a system including a hazard switch and an automatic stop controller, the hazard switch being a momentary switch configured to provide an instruction to flash or turn off hazard lights of a vehicle, the automatic stop controller performing automatic stop control for causing the vehicle to automatically stop when a predetermined condition is met, the emergency stop method comprising the steps of:
- (i) switching the hazard lights between a flashing state and a turned-off state each time the hazard switch is pressed by a user while the automatic stop control is not being performed;
- (ii) bringing the hazard lights into the flashing state upon start of the automatic stop control; and
- (iii) turning off the hazard lights upon depression of the hazard switch while the hazard lights are flashing during execution of the automatic stop control, wherein the step (iii) turns off the hazard lights upon depression of the hazard switch while the hazard lights are flashing even if the automatic stop control is being performed.

* * * * *